(12) United States Patent
Kim et al.

(10) Patent No.: US 12,301,508 B2
(45) Date of Patent: *May 13, 2025

(54) APPARATUS AND METHOD FOR COMMUNICATION BASED ON MULTI-RESOURCE UNIT IN WIRELESS LOCAL AREA NETWORK SYSTEM

(71) Applicant: SAMSUNG ELECTRONICS CO., LTD., Suwon-Si (KR)

(72) Inventors: Myeongjin Kim, Seongnam-si (KR); Wookbong Lee, San Jose, CA (US); Eunsung Jeon, Seoul (KR); Jonghun Han, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/306,617

(22) Filed: Apr. 25, 2023

(65) Prior Publication Data

US 2023/0261846 A1 Aug. 17, 2023

Related U.S. Application Data

(63) Continuation of application No. 17/358,422, filed on Jun. 25, 2021.

(30) Foreign Application Priority Data

Mar. 10, 2021 (KR) .................. 10-2021-0031464

(51) Int. Cl.
*H04L 5/00* (2006.01)
*H04W 72/0453* (2023.01)
(Continued)

(52) U.S. Cl.
CPC .......... *H04L 5/0058* (2013.01); *H04L 5/0048* (2013.01); *H04L 5/0094* (2013.01);
(Continued)

(58) Field of Classification Search
CPC ... H04L 5/0058; H04L 5/0048; H04L 5/0094; H04L 5/0037; H04L 27/2602;
(Continued)

(56) References Cited

U.S. PATENT DOCUMENTS 9,867,189 B2 1/2018 Lee et al.
10,348,471 B2 7/2019 Noh et al.
(Continued)

FOREIGN PATENT DOCUMENTS

| CN | 105072667 A | 11/2015 |
|---|---|---|
| CN | 105657858 A | 6/2016 |

(Continued)

OTHER PUBLICATIONS

European Search Report dated Dec. 1, 2021 in corresponding European Application No. 21183101.1 (10 pages).
(Continued)

*Primary Examiner* — Justin T Van Roie
(74) *Attorney, Agent, or Firm* — MORGAN, LEWIS & BOCKIUS LLP

(57) ABSTRACT

Provided is a method of wireless communication by a first device, the method including allocating multi-resource unit (MRU) to at least one second device; generating at least one resource unit (RU) allocation sub-field respectively corresponding to at least one sub-channel included in the MRU; and transmitting the at least one RU allocation sub-field to the at least one second device. Generating the at least one RU allocation sub-field may include identifying a first RU including a first sub-channel to indicate a zero user in the
(Continued)

MRU; and generating a first RU allocation sub-field corresponding to the first sub-channel based on the first RU.

20 Claims, 29 Drawing Sheets

Related U.S. Application Data

(60) Provisional application No. 63/046,778, filed on Jul. 1, 2020.

(51) Int. Cl.
*H04B 7/0452* (2017.01)
*H04W 84/12* (2009.01)

(52) U.S. Cl.
CPC ....... *H04W 72/0453* (2013.01); *H04B 7/0452* (2013.01); *H04W 84/12* (2013.01)

(58) Field of Classification Search
CPC ............. H04W 72/0453; H04W 84/12; H04W 72/042; H04W 72/0493; H04B 7/0452
See application file for complete search history.

(56) References Cited

U.S. PATENT DOCUMENTS

| | | | |
|---|---|---|---|
| 10,356,777 B2 | 7/2019 | Banerjea et al. | |
| 10,477,576 B2 | 11/2019 | Lou et al. | |
| 10,582,025 B2 | 3/2020 | Josiam et al. | |
| 10,805,912 B2 | 10/2020 | Huang et al. | |
| 11,737,123 B2 * | 8/2023 | Kim .................. | H04W 72/21 370/329 |
| 2017/0094664 A1 | 3/2017 | Lee et al. | |
| 2017/0332385 A1 | 11/2017 | Shirali et al. | |
| 2018/0063821 A1 | 3/2018 | Huang et al. | |
| 2019/0069298 A1 | 2/2019 | Chen et al. | |
| 2019/0238288 A1 | 8/2019 | Liu et al. | |
| 2019/0380117 A1 | 12/2019 | Verma et al. | |
| 2020/0136773 A1 | 4/2020 | Chen et al. | |
| 2021/0281384 A1 | 9/2021 | Hu et al. | |
| 2021/0337546 A1 | 10/2021 | Kim et al. | |
| 2022/0006594 A1 | 1/2022 | Kim et al. | |
| 2023/0006787 A1 | 1/2023 | Yu et al. | |

FOREIGN PATENT DOCUMENTS

| | | |
|---|---|---|
| CN | 107534502 A | 1/2018 |
| CN | 107925470 A | 4/2018 |
| EP | 3876470 | 9/2021 |

OTHER PUBLICATIONS

Oded Redlich (Huawei): "Discussion on Multi-RU in 802.11be", IEEE Draft; 11-20-0128-01-00BE-DISCUSSION-ON-MULTI-RU-IN-802-11BE, IEEE-SA Mentor, Piscataway, NJ USA, vol. 802.11 EHT; 802.11be, No. 1 Jan. 16 (Jan. 16, 2020), pp. 1-33, XP068165368, Retrieved from the Internet: URL:https://mentor.ieee.org/802.11/dcn/20/11-20-0128-01-00be-discussion-on-multi-ru-in-802-11be.pptx.

Office Action dated Jun. 21, 2024 in corresponding U.S. Appl. No. 17/358,422.

Office Action dated Mar. 28, 2025 issued in Chinese Patent Application No. 202110735431.2.

3rd Generation Partnership Project; Technical Specification Group Radio Access Network; Small cell enhancemnets for E-UTRA and E-UTRAN—Physical layer aspects (Release 12), 3GPP Organizational Partners, Dec. 2013, vol. 12.1.0, pp. 1-100.

* cited by examiner

FIG. 5A

| RU Table Index (b8b7b6b5b4b3b2b1b0) | Lowest to highest frequency order ||||||||| No. of entries |
|---|---|---|---|---|---|---|---|---|---|---|
| | #1 | #2 | #3 | #4 | #5 | #6 | #7 | #8 | #9 | |
| 000000000 | 26 | 26 | 26 | 26 | 26 | 26 | 26 | 26 | 26 | 1 |
| 000000001 | 26 | 26 | 26 | 26 | 26 | 26 | 26 | 52 || 1 |
| 000000010 | 26 | 26 | 26 | 26 | 26 | 52 || 26 | 26 | 1 |
| 000000011 | 26 | 26 | 26 | 26 | 26 | 52 || 52 || 1 |
| 000000100 | 26 | 26 | 52 || 26 | 26 | 26 | 26 | 26 | 1 |
| 000000101 | 26 | 26 | 52 || 26 | 26 | 26 | 52 || 1 |
| 000000110 | 26 | 26 | 52 || 26 | 52 || 26 | 26 | 1 |
| 000000111 | 26 | 26 | 52 || 26 | 52 || 52 || 1 |
| 000001000 | 52 || 26 | 26 | 26 | 26 | 26 | 26 | 26 | 1 |
| 000001001 | 52 || 26 | 26 | 26 | 26 | 26 | 52 || 1 |
| 000001010 | 52 || 26 | 26 | 26 | 52 || 26 | 26 | 1 |
| 000001011 | 52 || 26 | 26 | 26 | 52 || 52 || 1 |
| 000001100 | 52 || 52 || 26 | 26 | 26 | 26 | 26 | 1 |
| 000001101 | 52 || 52 || 26 | 26 | 26 | 52 || 1 |
| 000001110 | 52 || 52 || 26 | 52 || 26 | 26 | 1 |
| 000001111 | 52 || 52 || 26 | 52 || 52 || 1 |
| 000010000 | 26 | 26 | 26 | 26 | 26 | 106 |||| 1 |
| 000010001 | 26 | 26 | 52 || 26 | 106 |||| 1 |
| 000010010 | 52 || 26 | 26 | 26 | 106 |||| 1 |
| 000010011 | 52 || 52 || 26 | 106 |||| 1 |
| 000010100 | 106 |||| 26 | 26 | 26 | 26 | 26 | 1 |
| 000010101 | 106 |||| 26 | 26 | 26 | 52 || 1 |
| 000010110 | 106 |||| 26 | 52 || 26 | 26 | 1 |
| 000010111 | 106 |||| 26 | 52 || 52 || 1 |
| 000011000 | 52 || 52 || - | 52 || 52 || 1 |
| 000011001 | 106 |||| 26 | 106 |||| 1 |
| 000011010 | Punctured 242-tone RU ||||||||| 1 |
| 000011011 | Unassigned 242-tone RU ||||||||| 1 |
| 000011100 | 242-tone RU; contributes zero User fields to the User Specific field in the same EHT-SIG content channel as this RU Allocation subfield and is not unallocated. ||||||||| 1 |
| 000011101 | 484-tone RU; contributes zero User fields to the User Specific field in the same EHT-SIG content channel as this RU Allocation subfield and is not unallocated. ||||||||| 1 |
| 000011110 | 996-tone RU; contributes zero User fields to the User Specific field in the same EHT-SIG content channel as this RU Allocation subfield and is not unallocated. ||||||||| 1 |
| 000011111 | Validate ||||||||| 1 |

FIG. 5B

| RU Table Index (b8b7b6b5b4 b3b2b1b0) | Lowest to highest frequency order ||||||||| No. of entries |
|---|---|---|---|---|---|---|---|---|---|---|
| | #1 | #2 | #3 | #4 | #5 | #6 | #7 | #8 | #9 | |
| 000100000 | 26 | 26 | 26 | 26 | 26 | 52+26 || 26 | 1 |
| 000100001 | 26 | 26 | 52 || 26 | 52+26 || 26 | 1 |
| 000100010 | 52 || 26 | 26 | 26 | 52+26 || 26 | 1 |
| 000100011 | 52 || 52 || 26 | 52+26 || 26 | 1 |
| 000100100 | 26 | 52+26 || 26 | 26 | 26 | 26 | 26 | 1 |
| 000100101 | 26 | 52+26 || 26 | 26 | 26 | 52 || 1 |
| 000100110 | 26 | 52+26 || 26 | 52 || 26 | 26 | 1 |
| 000100111 | 26 | 52+26 || 26 | 52 || 52 || 1 |
| 000101000 | 26 | 26 | 26 | 26 | 106+26 |||| 1 |
| 000101001 | 26 | 26 | 52 || 106+26 |||| 1 |
| 000101010 | 52 || 26 | 26 | 106+26 |||| 1 |
| 000101011 | 52 || 52 || 106+26 |||| 1 |
| 000101100 | 106+26 |||| 26 | 26 | 26 | 26 | 1 |
| 000101101 | 106+26 |||| 26 | 26 | 52 || 1 |
| 000101110 | 106+26 |||| 52 || 26 | 26 | 1 |
| 000101111 | 106+26 |||| 52 || 52 || 1 |
| 000110000 | 106+26 |||| 106 |||| 1 |
| 000110001 | 106+26 |||| 52+26 || 26 | 1 |
| 000110010 | 106 |||| 106+26 |||| 1 |
| 000110011 | 26 | 52+26 || 106+26 |||| 1 |
| 000110100 | 106 ||| 26 | 52+26 || 26 | 1 |
| 000110101 | 26 | 52+26 || 26 | 106 ||| 1 |
| 000110110 | 26 | 52+26 || 26 | 52+26 || 26 | 1 |
| 000110111 | 52 || 52+26 || 52 || 52 || 1 |
| 000111000- 000111111 | Validate ||||||||| 8 |
| 001000y2y1y0 | 242 ||||||||| 8 |
| 001001y2y1y0 | 484 ||||||||| 8 |
| 001010y2y1y0 | 996 ||||||||| 8 |
| 001011y2y1y0 | 2x996 ||||||||| 8 |

FIG. 5C

| RU Table Index (b8b7b6b5b4b3b2b1b0) | Lowest to highest frequency order | | | | | | | | | No. of entries |
|---|---|---|---|---|---|---|---|---|---|---|
| | #1 | #2 | #3 | #4 | #5 | #6 | #7 | #8 | #9 | |
| 001100y2y1y0 | MRU of []-242-484 | | | | | | | | | 8 |
| 001101y2y1y0 | MRU of 242-[]-484 | | | | | | | | | 8 |
| 001110y2y1y0 | MRU of 484-[]-242 | | | | | | | | | 8 |
| 001111y2y1y0 | MRU of 484-242-[] | | | | | | | | | 8 |
| 010000y2y1y0 | MRU of []-484-996 | | | | | | | | | 8 |
| 010001y2y1y0 | MRU of 484-[]-996 | | | | | | | | | 8 |
| 010010y2y1y0 | MRU of 996-[]-484 | | | | | | | | | 8 |
| 010011y2y1y0 | MRU of 996-484-[] | | | | | | | | | 8 |
| 010100y2y1y0 | MRU of []-996-996-996 | | | | | | | | | 8 |
| 010101y2y1y0 | MRU of 996-[]-996-996 | | | | | | | | | 8 |
| 010110y2y1y0 | MRU of 996-996-[]-996 | | | | | | | | | 8 |
| 010111y2y1y0 | MRU of 996-996-996-[] | | | | | | | | | 8 |
| 011000y2y1y0 | MRU of []-484-996-996-996 | | | | | | | | | 8 |
| 011001y2y1y0 | MRU of 484-[]-996-996-996 | | | | | | | | | 8 |
| 011010y2y1y0 | MRU of 996-[]-484-996-996 | | | | | | | | | 8 |
| 011011y2y1y0 | MRU of 996-484-[]-996-996 | | | | | | | | | 8 |
| 011100y2y1y0 | MRU of 996-996-[]-484-996 | | | | | | | | | 8 |
| 011101y2y1y0 | MRU of 996-996-484-[]-996 | | | | | | | | | 8 |
| 011110y2y1y0 | MRU of 996-996-996-[]-484 | | | | | | | | | 8 |
| 011111y2y1y0 | MRU of 996-996-996-484-[] | | | | | | | | | 8 |
| 100000y2y1y0 | MRU of []-484-996-996 | | | | | | | | | 8 |
| 100001y2y1y0 | MRU of 484-[]-996-996 | | | | | | | | | 8 |
| 100010y2y1y0 | MRU of 996-[]-484-996 | | | | | | | | | 8 |
| 100011y2y1y0 | MRU of 996-484-[]-996 | | | | | | | | | 8 |
| 100100y2y1y0 | MRU of 996-996-[]-484 | | | | | | | | | 8 |
| 100101y2y1y0 | MRU of 996-996-484-[] | | | | | | | | | 8 |
| 100110000-111111111 | Disregard | | | | | | | | | 208 |

FIG. 9

| RU Table Index | Lowest to highest frequency order | | | | | | | | | No. of entries |
|---|---|---|---|---|---|---|---|---|---|---|
| | #1 | #2 | #3 | #4 | #5 | #6 | #7 | #8 | #9 | |
| x | 242-tone RU; contributes zero User fields to the User Specific field | | | | | | | | | 1 |
| y | 484-tone RU; contributes zero User fields to the User Specific field | | | | | | | | | 1 |
| z | 996-tone RU; contributes zero User fields to the User Specific field | | | | | | | | | 1 |

FIG. 11

| RU Table Index | Lowest to highest frequency order | | | | | | | | | No. of entries |
|---|---|---|---|---|---|---|---|---|---|---|
| | #1 | #2 | #3 | #4 | #5 | #6 | #7 | #8 | #9 | |
| x | 242-tone RU or 484-tone RU; contributes zero User fields to the User Specific field | | | | | | | | | 1 |
| y | 996-tone RU; contributes zero User fields to the User Specific field | | | | | | | | | 1 |

FIG. 15

| RU Table Index | Lowest to highest frequency order ||||||||| No. of entries |
|---|---|---|---|---|---|---|---|---|---|---|
| | #1 | #2 | #3 | #4 | #5 | #6 | #7 | #8 | #9 | |
| x | 242-tone RU; contributes zero User fields to the User Specific field ||||||||| 1 |
| y | 484-tone RU; contributes zero User fields to the User Specific field ||||||||| 1 |
| z | 996-tone RU; contributes zero User fields to the User Specific field ||||||||| 1 |
| w | M-RU; contributes zero User fields to the User Specific field ||||||||| 1 |

FIG. 17

| RU Table | Lowest to highest frequency order ||||||||| No. of entries |
|---|---|---|---|---|---|---|---|---|---|---|
| | #1 | #2 | #3 | #4 | #5 | #6 | #7 | #8 | #9 | |
| p | Punctured 242-tone RU |||||||||| 1 |
| q | Unassigned 242-tone RU |||||||||| 1 |

FIG. 20A

| RU Table Index | Lowest to highest frequency order | | | | | | | | | No. of entries |
|---|---|---|---|---|---|---|---|---|---|---|
| | #1 | #2 | #3 | #4 | #5 | #6 | #7 | #8 | #9 | |
| ⋮ | ⋮ | | | | | | | | | ⋮ |
| R1 | MRU1 when BW = BW1 or MRU1' when BW = BW2 | | | | | | | | | n |
| R2 | MRU2 when BW = BW1 or MRU2' when BW = BW2 | | | | | | | | | n |
| ⋮ | ⋮ | | | | | | | | | ⋮ |
| Ri | MRUi when BW = BW1 or MRUi' when BW = BW2 | | | | | | | | | n |
| Rj | MRUj when BW = BW1 | | | | | | | | | n |
| Rk | MRUk when BW = BW1 | | | | | | | | | n |
| ⋮ | ⋮ | | | | | | | | | ⋮ |

FIG. 20B

| BW | RU Table Index | Lowest to highest frequency order | | | | | | | | | No. of entries |
|---|---|---|---|---|---|---|---|---|---|---|---|
| | | #1 | #2 | #3 | #4 | #5 | #6 | #7 | #8 | #9 | |
| ⋮ | ⋮ | | | | ⋮ | | | | | | ⋮ |
| BW2 | R1 | MRU1' | | | | | | | | | n |
| | R2 | MRU2' | | | | | | | | | n |
| | ⋮ | | | | ⋮ | | | | | | ⋮ |
| | Ri | MRUi' | | | | | | | | | n |
| BW1 | R1 | MRU1 | | | | | | | | | n |
| | R2 | MRU2 | | | | | | | | | n |
| | ⋮ | | | | ⋮ | | | | | | ⋮ |
| | Ri | MRUi | | | | | | | | | n |
| | Rj | MRUj | | | | | | | | | n |
| | Rk | MRUk | | | | | | | | | n |
| | ⋮ | | | | ⋮ | | | | | | ⋮ |
| ⋮ | ⋮ | | | | ⋮ | | | | | | ⋮ |

APPARATUS AND METHOD FOR COMMUNICATION BASED ON MULTI-RESOURCE UNIT IN WIRELESS LOCAL AREA NETWORK SYSTEM

CROSS-REFERENCE TO RELATED APPLICATIONS

This application is a continuation under 35 U.S.C. 120 of U.S. patent application Ser. No. 17/358,422, filed on Jun. 25, 2021 in the United States Patent and Trademark Office, which is based on and claims priority under 35 U.S.C. § 119 to U.S. Provisional Application No. 63/046,778, filed on Jul. 1, 2020, and Korean Patent Application No. 10-2021-0031464, filed on Mar. 10, 2021 in the Korean Intellectual Property Office, the disclosures of all of which are incorporated by reference herein in their entireties.

TECHNICAL FIELD

This disclosure relates generally to wireless communication, and more particularly, to an apparatus and a method for communication based on a multi-resource unit (MRU) in a wireless local area network (WLAN) system.

DISCUSSION OF RELATED ART

A WLAN system is one example of wireless communication interconnecting two or more devices in a local environment such as a house or a campus. A WLAN system may be based on the institute of electrical and electronics engineers (IEEE) 802.11 standard, which has progressed through multiple versions including 802.11a, 802.11b, 802.11 g, 802.11n, 802.11ac, and 802.11ax. Recent versions may support transmission speeds up to 1 Gbyte/s based on an orthogonal frequency-division multiplexing (OFDM) technique.

In the 802.11ac standard, data may be simultaneously transmitted to a plurality of users by using a multi-user multi-input multi-output (MU-MIMO) scheme, which employs spatial multiplexing of signals via several antenna beams. In 802.11ax, also referred to as high efficiency (HE), multiple access is implemented by assigning different subcarriers within an overall bandwidth to different users using an orthogonal frequency-division multiple access (OFDMA) scheme as well as a MU-MIMO scheme. Therefore, a WLAN system to which the 802.11ax is applied may effectively support communication in a densely-populated area and outdoors.

In 802.11be, also called extremely high throughput (EHT), there are attempts to implement 6 GHz unlicensed frequency band support, utilization of maximum 320 MHz per channel, introduction of hybrid automatic repeat and request (HARQ), and maximum 16×16 MIMO support. Therefore, a next-generation WLAN system is expected to effectively support low latency and ultra high-speed transmission akin to new radio (NR) 5G technology.

SUMMARY

Embodiments of the inventive concept provide an apparatus and a method for efficiently allocating a multi-resource unit (MRU) to a user in a wireless local area network (WLAN) system.

According to an aspect of the inventive concept, there is provided a method of wireless communication by a first device. The method includes allocating a multi-resource unit (MRU) to at least one second device, and generating at least one resource unit (RU) allocation sub-field respectively corresponding to at least one sub-channel included in the MRU. The at least one RU allocation sub-field may be transmitted to the at least one second device. Generating the at least one RU allocation sub-field may include identifying a first RU including a first sub-channel to indicate a zero user in the MRU; and generating a first RU allocation sub-field, of the at least one RU allocation sub-field, that corresponds to the first sub-channel, based on the first RU.

According to another aspect of the inventive concept, there is provided a first device configured to communicate with at least one second device in a wireless local area network (WLAN), the first device including a transceiver; and processing circuitry configured to allocate an MRU) to the at least one second device, generate at least one RU) allocation sub-field respectively corresponding to at least one sub-channel included in the MRU, and provide the at least one RU allocation sub-field to the at least one second device through the transceiver. The processing circuitry may be configured to identify a first RU including a first sub-channel to indicate zero user in the MRU and generate a first RU allocation sub-field corresponding to the first sub-channel as one of the at least one RU allocation sub-field based on the first RU.

According to another aspect of the inventive concept, there is provided a method of wireless communication by a second device, the method including obtaining at least one resource unit (RU) allocation sub-field respectively corresponding to at least one sub-channel from a first device; identifying an MRU based on the at least one RU allocation sub-field; and identifying at least one pilot subcarrier based on the MRU, wherein the identifying of the MRU includes identifying a first RU allocation sub-field indicating zero user; and identifying a first RU including a first sub-channel corresponding to the first RU allocation sub-field in the MRU based on the first RU allocation sub-field.

According to another aspect of the inventive concept, there is provided a method of wireless communication by a first device, the method including allocating multi-resource unit (MRU) to at least one second device; generating at least one resource unit (RU) allocation sub-field respectively corresponding to at least one sub-channel included in the MRU; and providing the at least one RU allocation sub-field to the at least one second device, wherein the generating of the at least one RU allocation sub-field includes identifying at least one first sub-channel to indicate zero user in the MRU; and setting at least one first RU allocation sub-field corresponding to the at least one first sub-channel, to a first value.

According to another aspect of the inventive concept, there is provided a method of wireless communication by a first device with at least one second device, the method including generating a bandwidth sub-field indicating a bandwidth to be used for the wireless communication; allocating an MRU within the bandwidth to the at least one second device in the bandwidth; generating an RU allocation sub-field based on the bandwidth, the MRU, and a quantity of the at least one second device; and transmitting a physical layer protocol data unit (PPDU) including the bandwidth sub-field and the RU allocation sub-field in a preamble to the at least one second device.

According to another aspect of the inventive concept, there is provided a method of wireless communication by a second device, the method including receiving a physical layer protocol data unit (PPDU) from a first device; extracting a bandwidth sub-field and a resource unit (RU) allocation sub-field from a preamble of the PPDU; identifying a bandwidth based on the bandwidth sub-field; and identifying an MRU based on the bandwidth and the RU allocation sub-field.

According to another aspect of the inventive concept, there is provided a method of wireless communication by a first device, the method including allocating at least one RU to at least one second device in a bandwidth; generating at least one RU allocation sub-field based on the at least one RU; and providing the at least one RU allocation sub-field to the at least one second device, wherein the generating of the at least one RU allocation sub-field comprises identifying a sub-channel that is not used for data transmission in the bandwidth; and generating a first RU allocation sub-field corresponding to the sub-channel based on whether a preamble of the sub-channel is punctured.

According to still another aspect of the inventive concept, a method of wireless communication by a first device involves allocating an MRU to a station, and generating an RU allocation sub-field that indicates the MRU and a zero user portion of the MRU. The RU allocation sub-field is transmitted to the station, and the first device wirelessly communicates with the station using the MRU. The zero user portion of the MRU is a range of frequencies that are not used for wireless communication between the first device and any station.

BRIEF DESCRIPTION OF THE DRAWINGS

Embodiments of the inventive concept will be more clearly understood from the following detailed description taken in conjunction with the accompanying drawings in which:

FIGS. 5A, 5B, and 5C are tables showing RU allocation indexing according to an example embodiment of the inventive concept;

FIG. 9 is a diagram showing an RU allocation indexing according to an example embodiment of the inventive concept;

FIG. 11 is a diagram showing an RU allocation indexing according to an example embodiment of the inventive concept;

FIG. 15 is a diagram showing an RU allocation indexing according to an example embodiment of the inventive concept;

FIG. 17 is a diagram showing another RU allocation indexing according to an example embodiment of the inventive concept;

FIGS. 20A and 20B are diagrams showing RU allocation indexing according to example embodiments of the inventive concept.

DETAILED DESCRIPTION OF EMBODIMENTS

Hereinafter, embodiments of the inventive concept will be described in detail mainly based on an OFDM or OFDMA-based wireless communication system (particularly, the IEEE 802.11 standard). However, the inventive concept may also be applied to any other communication systems having similar technical characteristics and a similar channel structure, e.g., a cellular communication system such as long term evolution (LTE), LTE-advance (LTE-A), new radio (NR), wireless broadband (WiBro), and global system for mobile communication (GSM) or a short-distance communication system such as Bluetooth and near field communication (NFC).

Figure 1:
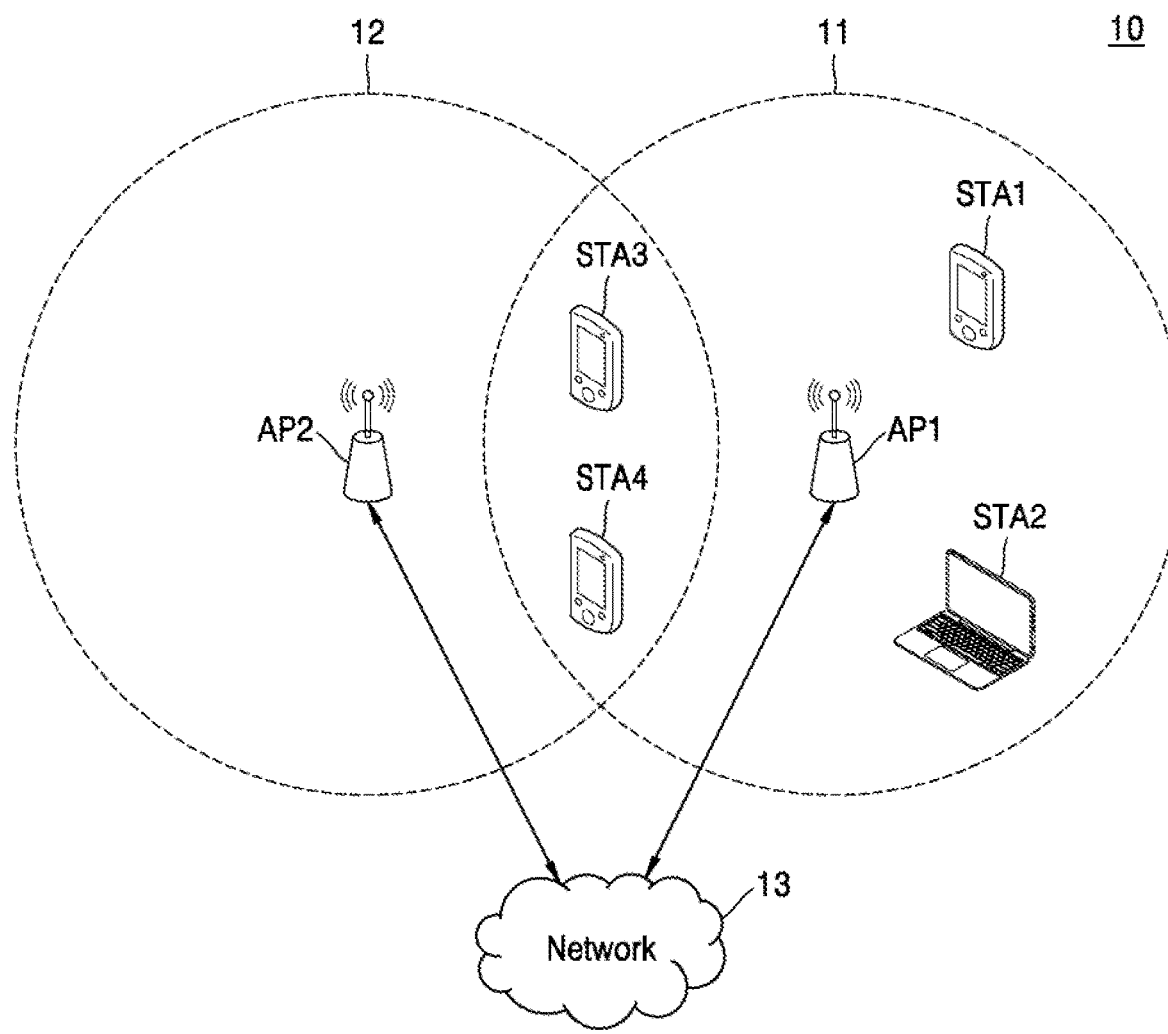
FIG. 1 is a diagram showing a wireless communication system according to an embodiment of the inventive concept.

FIG. 1 is a diagram showing a wireless communication system 10 according to an embodiment of the inventive concept. FIG. 1 shows a wireless local area network (WLAN) system as an example of the wireless communication system 10.

The example of FIG. 1 illustrates an environment with overlapping coverage regions serviced by different access points. Here, the wireless communication system 10 may include first and second access points AP1 and AP2 and first to fourth stations STA1 to STA4. The first and second access points AP1 and AP2 may access a network 13 such as the Internet, an Internet protocol (IP) network, an intranet, etc. A first access point AP1 may provide access to the network 13 within a first coverage region 11 to communicate with the first to fourth stations STA1 to STA4, and a second access point AP2 may also provide access to the network 13 within a second coverage region 12 to communicate with the third and fourth stations STA3 and STA4. The first and second access points AP1 and AP2 may communicate with at least one of the first to fourth stations STA1 to STA4 based on IEEE 802.11 based wireless fidelity (WiFi) or any other WLAN access technology.

An access point (AP) may be referred to as a router or a gateway, and a station (STA) may be referred to as a mobile station, a subscriber station, a terminal, a mobile terminal, a wireless terminal, a user equipment, or a user. A station may be a portable device such as a mobile phone, a laptop computer, or a wearable device, or may be a stationary device like a desktop computer or a smart TV. Herein, an AP may be referred to as a first device, and a station may be referred to as a second device or a third device. Examples of APs and stations will be described later with reference to FIG. 21.

An AP may allocate at least one resource unit (RU) to at least one station. The AP may transmit data through at least one allocated RU, and the at least one station may receive data through the at least one allocated RU. In 802.11ax (hereinafter referred to as HE), an AP may allocate only a single RU to at least one station. However, in 802.11be (hereinafter referred to as EHT) or next-generation IEEE 802.11 standards (hereinafter referred to as EHT+), the AP may allocate a multi-resource unit (MRU) including two or more RUs to the at least one station. For example, the first access point AP1 may allocate an MRU to at least one of first to fourth stations STA1 to STA4 and transmit data through the allocated MRU. As described later, embodiments of the inventive concept enable an MRU to be efficiently allocated to stations, and thus spectrum efficiency and a data transmission rate in a physical layer may be improved. Further, in embodiments described herein, the configuration of an MRU may be easily identified by a station, and thus the utilization of a pilot subcarrier may be improved.

Figure 2:
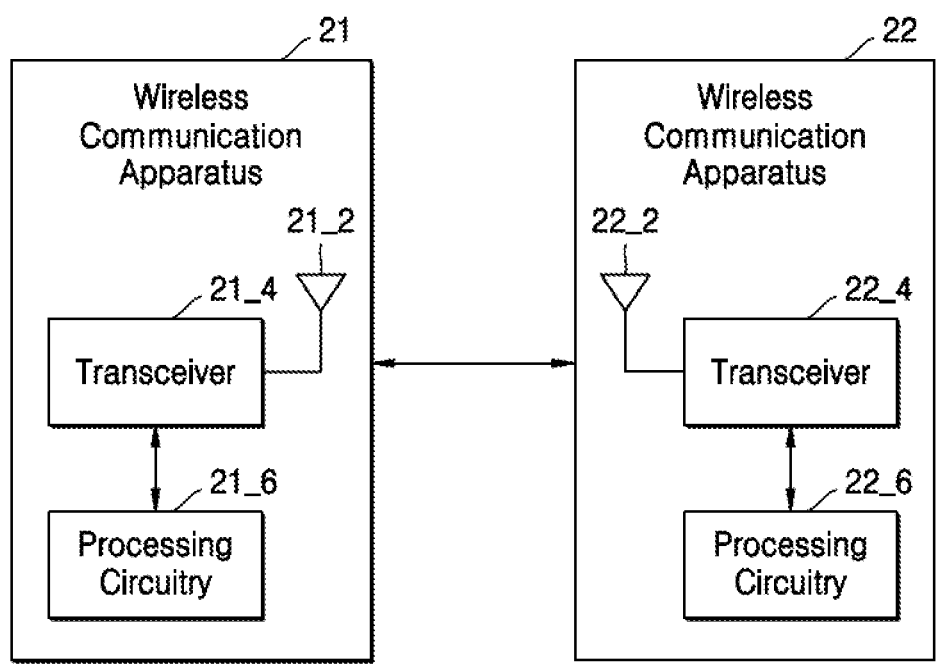
FIG. 2 is a block diagram showing a wireless communication system according to an embodiment of the inventive concept.

FIG. 2 is a block diagram showing a wireless communication system 20 according to an embodiment of the inventive concept. For example, FIG. 2 shows a first wireless communication device 21 ("first device 21") and a second wireless communication device 22 ("second device 22") that communicate with each other in the wireless communication system 20. Each of the first device 21 and the second device 22 of FIG. 2 may be any device that performs communication in the wireless communication system 20 and may be referred to as a device for wireless communication. Each of the first device 21 and the second device 22 may be an AP or a station of a WLAN system.

The first device 21 may include an antenna 21_2, a transceiver 21_4, and processing circuitry 21_6. In some embodiments, the antenna 21_2, the transceiver 21_4, and the processing circuitry 21_6 may be included in a single package or may be included in different packages, respectively. The second wireless communication device 22 may also include an antenna 22_2, a transceiver 22_4, and processing circuitry 22_6. Hereinafter, redundant descriptions of the first device 21 and the second device 22 will be omitted.

The antenna 21_2 may receive a signal from the second device 22 and provide the signal to the transceiver 21_4 and may also transmit a signal provided from the transceiver 21_4 to the second device 22. In some embodiments, the antenna 21_2 may include a plurality of antennas for multiple input multiple output (MIMO). Also, in some embodiments, the antenna 21_2 may be or include a phased array for beamforming.

In the receive direction, the transceiver 21_4 may process a signal received from the second device 22 through the antenna 21_2 and may provide a processed signal to the processing circuitry 21_6. On transmit, the transceiver 21_4 may process a signal provided from the processing circuitry 21_6 and may output a processed signal through the antenna 21_2. In some embodiments, the transceiver 21_4 may include analog circuitry such as a low noise amplifier, a mixer, a filter, a power amplifier, and an oscillator. In some embodiments, the transceiver 21_4 may process a signal received from the antenna 21_2 and/or a signal received from the processing circuitry 21_6 based on the control of the processing circuitry 21_6.

The processing circuitry 21_6 may extract information transmitted by the second wireless communication device 22 by processing a signal received from the transceiver 21_4. For example, the processing circuitry 21_6 may extract information by demodulating and/or decoding a signal received from the transceiver 21_4. Also, the processing circuitry 21_6 may generate a signal including information to be transmitted to the second wireless communication device 22 and provide the signal to the transceiver 21_4. For example, the processing circuitry 21_6 may provide a signal generated by encoding and/or modulating data to be transmitted to the second device 22 to the transceiver 21_4. In some embodiments, the processing circuitry 21_6 may include a programmable component like a central processing unit (CPU) and a digital signal processor (DSP), a reconfigurable component like a field programmable gate array (FPGA), or a component that provides a fixed function like an intellectual property (IP) core. The processing circuitry 21_6 may include or access a memory that stores data and/or a series of instructions. Herein, operations understood to be performed by the transceiver 21_4 and/or the processing circuitry 21_6 may be simply stated as being performed by the first device 21. Therefore, operations performed by an AP may be performed by a transceiver and/or processing circuitry included in the AP, and operations performed by a station may be performed by a transceiver and/or processing circuitry included in the station.

Figure 3A:
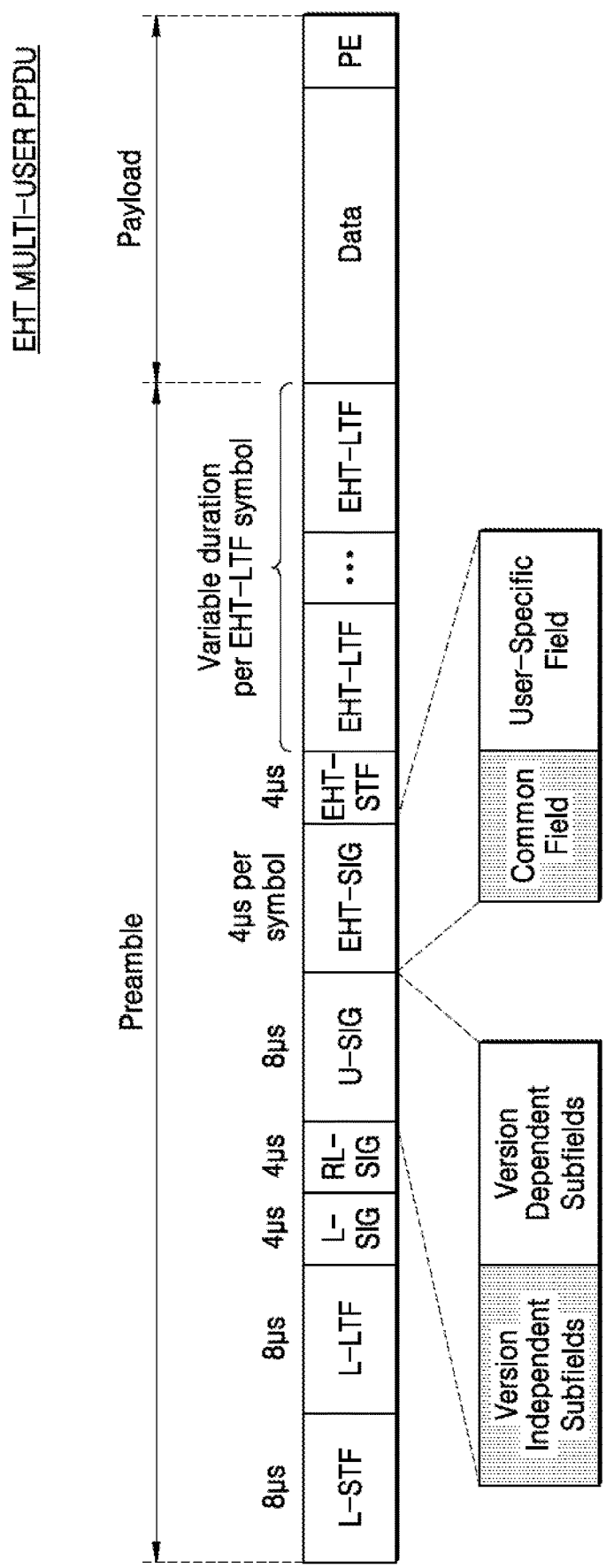
FIGS. 3A and 3B are diagrams showing examples of a physical layer protocol data unit (PPDU) according to example embodiments of the inventive concept.

FIG. 3A is a diagram showing an example format of a physical layer protocol data unit (PPDU) according to an example embodiment of the inventive concept, which is a format of an EHT multi-user (MU) PPDU. Note that HE may define the HE MU PPDU and the HE single user (SU) PPDU (HE-SIG-B is omitted from the HE MU PPDU). On the other hand, EHT may not define the EHT SU PPDU, and the EHT MU PPDU may be transmitted to a single user. The EHT MU PPDU may be set to a compressed mode or a non-compressed mode and may include OFDMA symbols in the non-compressed mode.

As shown in FIG. 3A, the EHT MU PPDU may include a preamble, which includes training fields and signaling fields; and a payload, which includes a data field. In the preamble, the EHT MU PPDU may include a legacy-short training field (L-STF), a legacy-long training field (L-LTF), a legacy-signal (L-SIG) field, a repeated legacy-signal (RL-SIG) field, a universal signal (U-SIG) field, an extremely high throughput-signal (EHT-SIG) field, an extremely high throughput-short training field (EHT-STF), and an extremely high throughput-long training field (EHT-LTF). In the payload, the EHT MU PPDU may include a data field and a packet extension (PE) field.

The L-STF may include a short training OFDM symbol and may be used for frame detection, automatic gain control (AGC), diversity detection, and coarse frequency/time synchronization. The L-LTF may include a long training OFDM symbol and may be used for fine frequency/time synchronization and channel estimation. The L-SIG field may be used for transmission of control information and may include information regarding a data rate and data length. The L-SIG field may be repeated in the RL-SIG field.

The U-SIG field may include control information common to at least one station receiving the EHT MU PPDU and may correspond to the HE-SIG-A of the HE. For example, as shown in FIG. 3A, the U-SIG field may include version-independent sub-fields and version-dependent sub-fields and may further include sub-fields, which respectively correspond to cyclic redundancy check (CRC) and the tail, and reserved bits. Version-independent sub-fields may have static locations and bit definitions in different generations and/or physical versions. For example, the U-SIG field may include sub-fields respectively corresponding to a version identifier, a PPDU bandwidth, UL/DL, a BSS color, and a TXOP duration as version-independent sub-fields. The U-SIG field may further include sub-fields respectively corresponding to a punctured channel indication, PPDU type and compressed mode, modulation and coding scheme (MCS) applied to the EHT-SIG field, and the number of EHT-SIG symbols as version-dependent sub-fields.

The EHT-SIG field may have a variable MCS and a variable length and may correspond to the HE-SIG-B of the HE. For example, when an EHT MU PPDU is transmitted to multiple users, the EHT-SIG field may include a common field including common control information and a user specific field (interchangeably, "user field") including user-dependent control information, as shown in FIG. 3A. The common field may include sub-fields respectively corresponding to U-SIG overflow, the total number of non-OFDMA users, and an RU allocation sub-field RUA. As described later with reference to FIGS. 6A and 6B, the common field may include RU allocation sub-fields respectively corresponding to sub-channels (e.g., 20 MHz) included in a bandwidth (e.g., an overall communication bandwidth of the WLAN system). Note that the RU allocation sub-field may be omitted from an EHT MU PPDU set to a compressed mode.

User specific fields for non-MU MIMO may include a STA-ID sub-field, an MCS sub-field, an NSTS sub-field, a Beam-formed sub-field, and a coding sub-field, whereas user specific fields for MU-MIMO may include a STA-ID sub-field, an MCS sub-field, a coding sub-field, and a spatial configuration sub-field. In some embodiments, a STA-ID sub-field included in a user specific field may have a value indicating an RU that is not allocated to a user. For example, when an RU not allocated to any user is smaller than a 242-tone RU (RU242), the STA-ID sub-field may have a value of 2046. An RU not allocated to any user may be indicated by an RU allocation sub-field, as described later with reference to FIG. 5A.

Figure 3B:
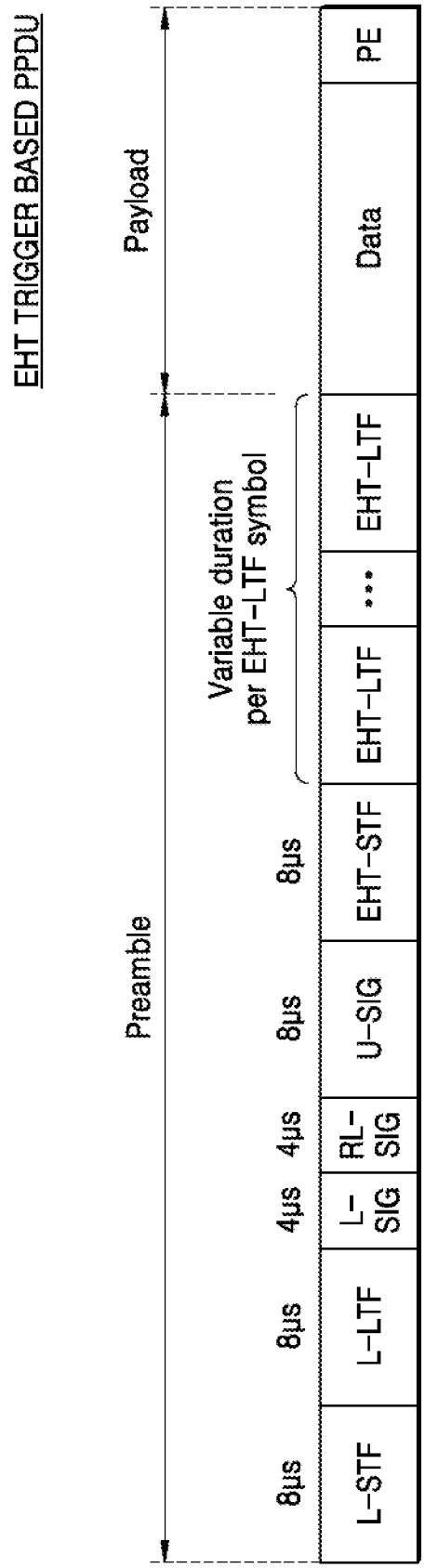

FIG. 3B illustrates an example of another PPDU according to an embodiment. This example illustrates EHT trigger-based (TB) PPDU, which includes training fields and signaling fields, and a payload including a data field. In the preamble, the EHT TB PPDU may include an L-STF, an L-LTF, an L-SIG field, a RL-SIG field, a U-SIG field, an EHT-STF, and an EHT-LTF. Compared with the EHT MU PPDU of FIG. 3A, the EHT-SIG field may be omitted in the preamble of the EHT TB PPDU. Also, in the payload, the EHT TB PPDU may include a data field and a PE field. The EHT TB PPDU may be transmitted based on a trigger frame, which is a media access control (MAC) frame transmitted from an AP to a station, and the trigger frame may include an RU allocation sub-field that defines an RU allocated for uplink transmission.

Hereinafter, example embodiments of the inventive concept will be mainly described with reference to at least one RU allocation sub-field included in the common field of the EHT-SIG field in the EHT MU PPDU of FIG. 3A, but RU allocations using other types of fields may be applied in other embodiments. For example, other example embodiments of the inventive concept may be applied to: (i) the RU allocation sub-field included in the trigger frame described above with reference to FIG. 3B; (ii) an RU allocation sub-field included in the HE-SIG-B or a trigger frame of HE; and (iii) an RU allocation sub-field to be defined in EHT+. Examples of an RU defined by an RU allocation sub-field will be described with reference to FIGS. 4A, 4B, and 4C.

Figure 4A:
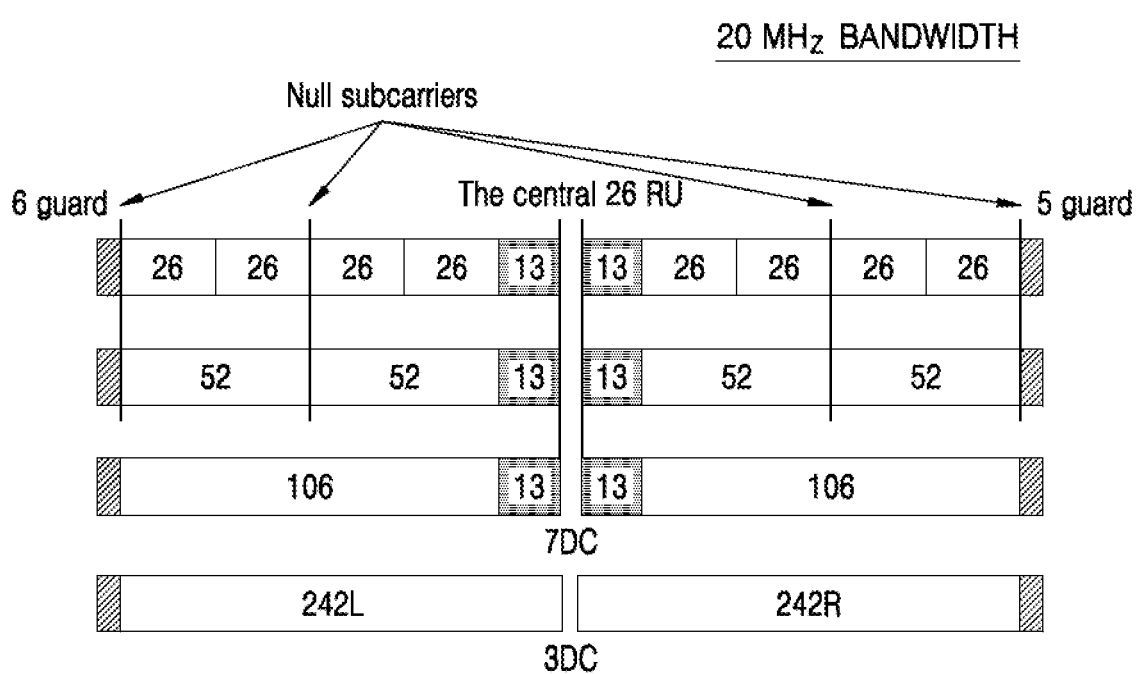
FIGS. 4A, 4B, and 4C are diagrams showing available resource units (RU) according to example embodiments of the inventive concept.
Figure 4B:
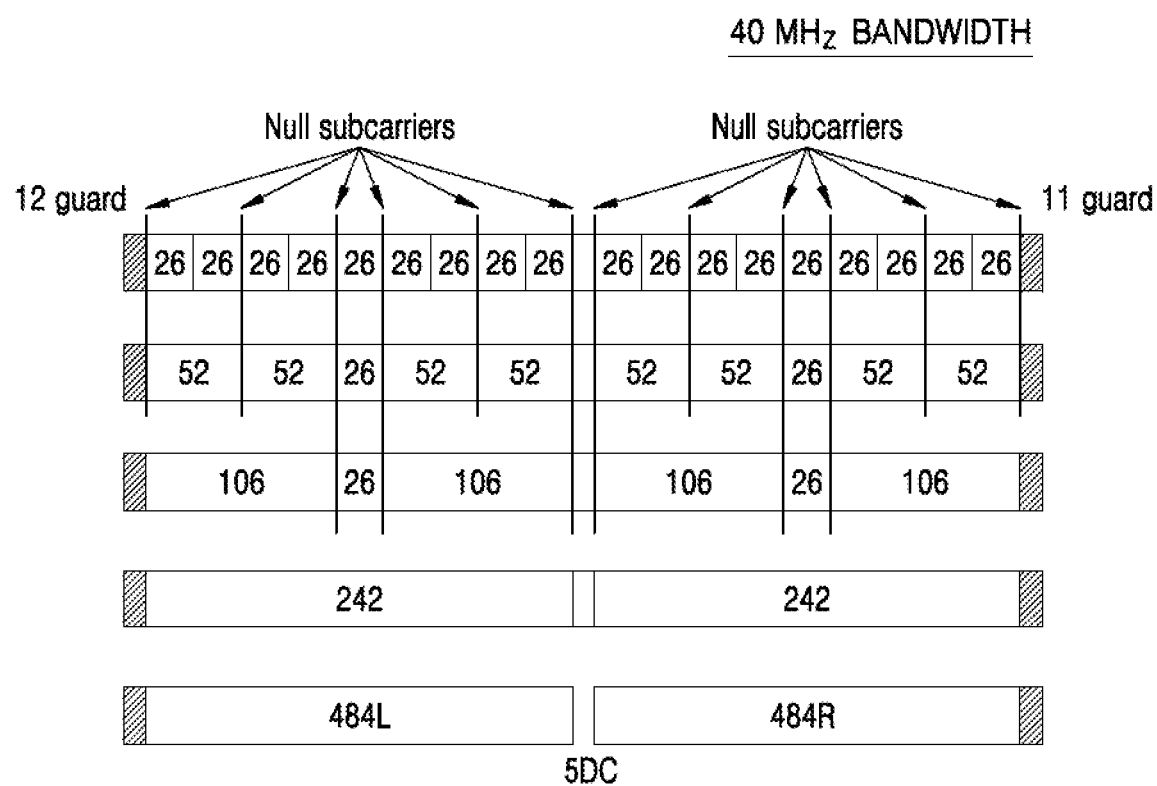
Figure 4C:
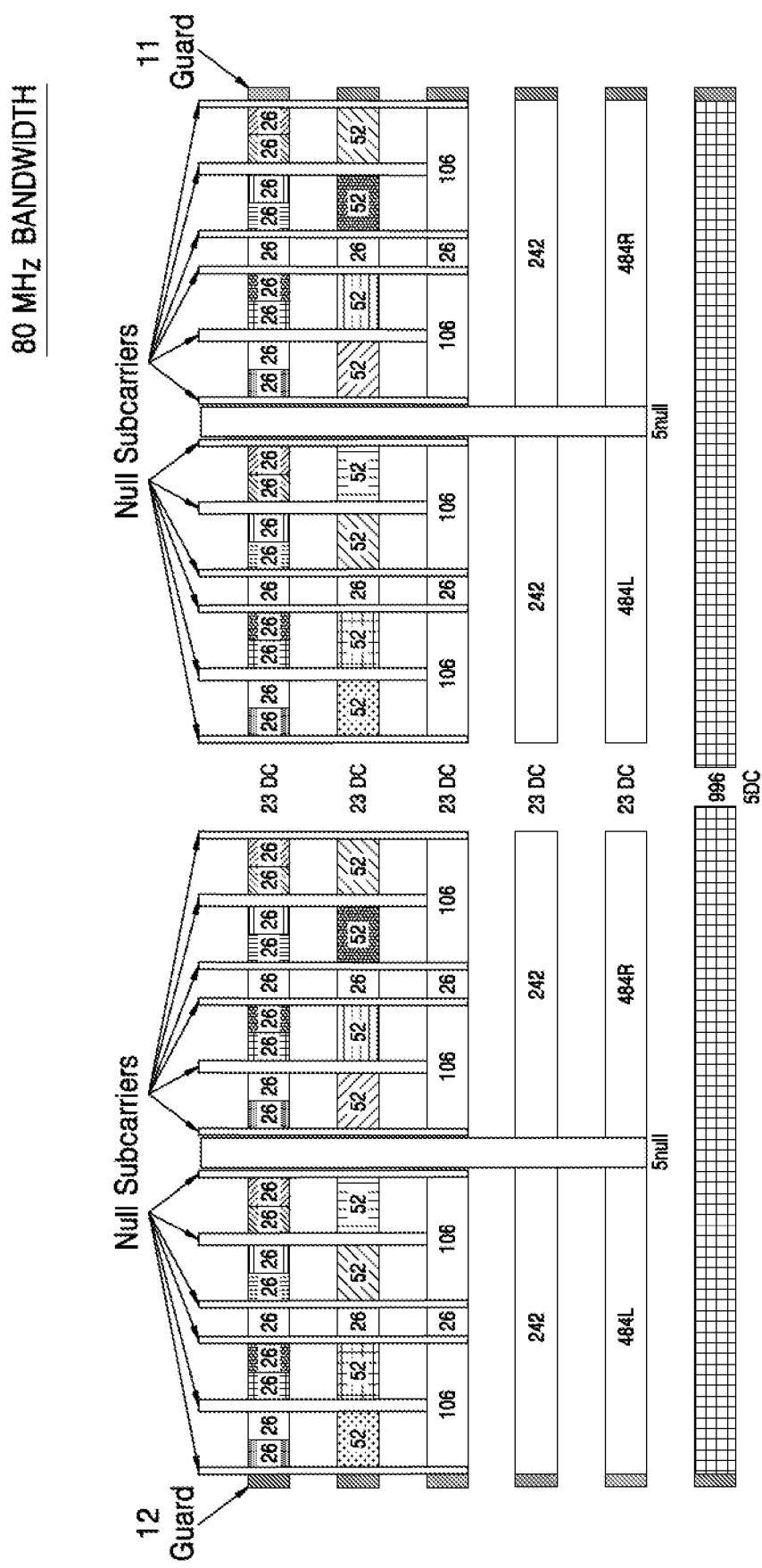

FIGS. 4A, 4B, and 4C are diagrams showing available resource units (RUs) according to example embodiments of the inventive concept. FIG. 4A shows available RUs in a 20 MHz bandwidth, FIG. 4B shows available RUs in a 40 MHz bandwidth, and FIG. 4C shows available RUs in an 80 MHz bandwidth. In FIGS. 4A, 4B, and 4C, the horizontal axis represents frequencies, and at least one RU may be allocated to at least one user, that is, a station operational in a bandwidth. Example embodiments of the inventive concept are not limited to the RUs shown in FIGS. 4A, 4B, and 4C.

Referring to FIG. 4A, 6 tones (i.e., 6 subcarriers) may be used as a guard band in the leftmost (i.e., the lowest) band in the 20 MHz bandwidth, and 5 tones may be used as a guard band in the rightmost (i.e., the highest) band in the 20 MHz bandwidth. Also, 7 direct current (DC) tones may be inserted into the center band (i.e., a DC band), and a 26-tone RU RU26 including 13 tones in each of the left side and the right side of the DC band may be disposed. As shown in FIG. 4A, in the 20 MHz bandwidth, a 26-tone RU RU26, a 52-tone RU RU52, and a 106-tone RU RU106 may be arranged, and a 242-tone RU RU242 including 242L and 242R may be disposed.

Figure 12:
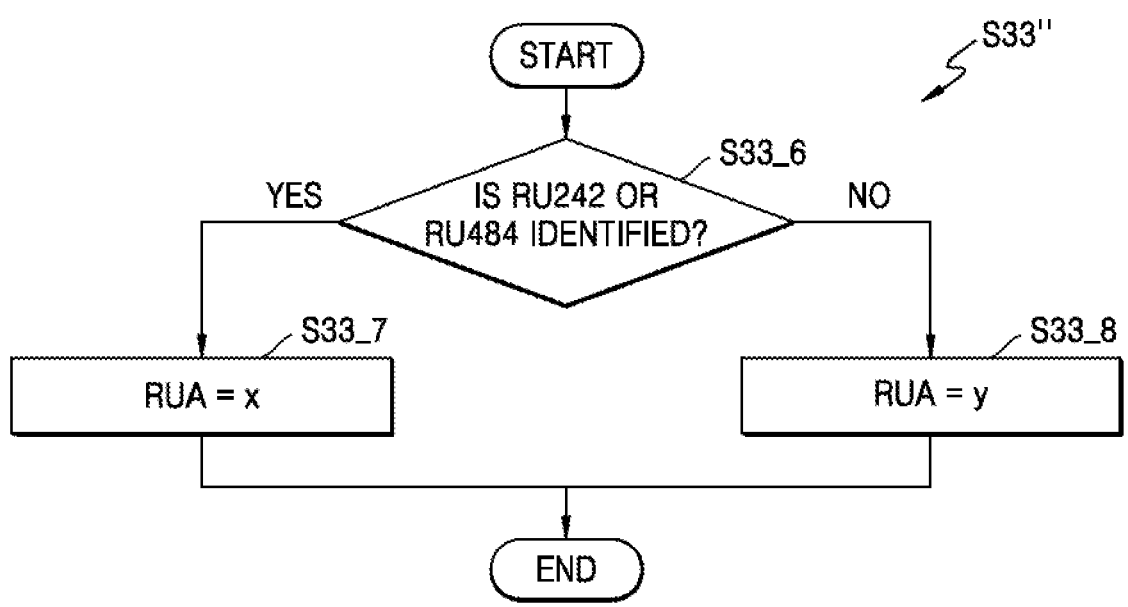
FIG. 12 is a flowchart of a method for communication based on the RU allocation indexing of FIG. 11, according to example embodiments of the inventive concept.

Referring to FIG. 4B, 12 tones may be used as a guard band in the leftmost (i.e., the lowest) band in the 40 MHz bandwidth, and 11 tones may be used as a guard band in the rightmost (i.e., the highest) band in the 40 MHz bandwidth. Also, 5 DC tones may be inserted into the center band. As shown in FIG. 4B, in the 40 MHz bandwidth, a 26-tone RU RU26, a 52-tone RU RU52, a 106-tone RU RU106, and a 242-tone RU RU242 may be disposed, and a 484-tone RU RU484 including 484L and 484R may be disposed.

Referring to FIG. 4C, 12 tones may be used as a guard band in the leftmost (i.e., the lowest) band in the 80 MHz bandwidth, and 11 tones may be used as a guard band in the rightmost (i.e., the highest) band in the 80 MHz bandwidth. Also, when RUs other than a 996-tone RU are allocated, 23 DC tones may be inserted into the center band. When the 996-tone RU is allocated, 5 DC tones may be inserted into the center band. As shown in FIG. 4C, in the 80 MHz bandwidth, a 26-tone RU RU26, a 52-tone RU RU52, a 106-tone RU RU106, and a 242-tone RU RU242 may be disposed, and a 484-tone RU RU484 including 484L and 484R and a 996-tone RU RU996 may be disposed. EHT may support bandwidths of 20 MHz, 40 MHZ, 80 MHz, 160 MHz and 320 MHz, and the arrangement of RUs in the 80 MHz bandwidth shown in FIG. 4C may be repeated in the bandwidths of 160 MHz and 320 MHz.

FIGS. 5A, 5B, and 5C are tables showing RU allocation indexing according to an example embodiment of the inventive concept. FIGS. 5A, 5B, and 5C may depict a collective table including RU allocations applicable in EHT and values of RU allocation sub-fields respectively corresponding thereto. For convenience of illustration, the table is divided and shown in FIGS. 5A, 5B, and 5C.

As shown in FIGS. 5A, 5B, and 5C, an RU allocation sub-field may have a length of 9-bits, where at least some of the bits represents an RU allocation. Also, an RU (a single RU or an MRU) may be allocated to two or more users, and an RU allocation sub-field nay have a portion indicating the number of users to which the RU is allocated (i.e., the number of MU-MIMO users). For example, as shown in FIG. 5B, an RU allocation sub-field corresponding to a 242-tone RU RU242 corresponding to 242 or more subcarriers in EHT may have a binary value '001000y2y1y0', where the number of MU-MIMO users (i.e., the number of "multiplexed stations", which are stations receiving spatially multiplexed signals) may be determined by the latter portion of the binary sequence, i.e., '$2^2$y2+$2^1$y1+y0+1'.

In some embodiments, an RU allocation sub-field may have a value indicating that an RU is not allocated to a user. For example, as shown in FIG. 5A, an RU allocation sub-field having a binary value '000011010' ("Punctured 242-tone RU") or '000011011' ("Unassigned 242-tone RU") may indicate that a 242-tone RU is not allocated to a user. A punctured RU may be a range of frequencies not to be used, so as to avoid interference with communications by a neighboring AP. An unassigned RU may be an RU that has not yet been assigned to a user. Also, as shown in FIG. 5A, an RU allocation sub-field having a binary value '000011000' may indicate that a middle 26-tone RU is not allocated to a user. Note that as described above with reference to FIG. 3A, when the value of the STA-ID sub-field included in the user specific field of the EHT-SIG field is 2046, the value may indicate an unallocated RU smaller than a 242-tone RU RU242.

In some embodiments, an RU allocation sub-field may have a value indicating that a corresponding sub-channel (i.e., corresponding to the RU allocation sub-field) is not used for data transmission. For example, as shown in FIG. 5A, when data is not transmitted through a 242-tone RU of a sub-channel corresponding to an RU allocation sub-field, the RU allocation sub-field may have a binary value '000011010' or '000011011' (Punctured or Unassigned 242-tone RU). In some embodiments, an RU allocation sub-field may have a value indicating zero user in a corresponding sub-channel. For example, as shown in FIG. 5A, to indicate zero user in a corresponding sub-channel, the RU allocation sub-field may have a binary value '000011100', '000011101', or '000011110'.

Figure 6A:
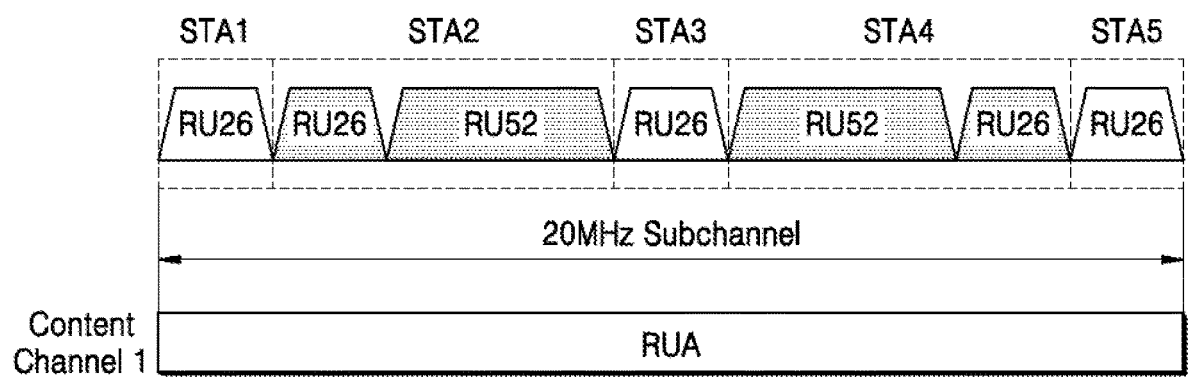
FIGS. 6A and 6B are diagrams showing examples of RUs allocated according to example embodiments of the inventive concept.
Figure 6B:
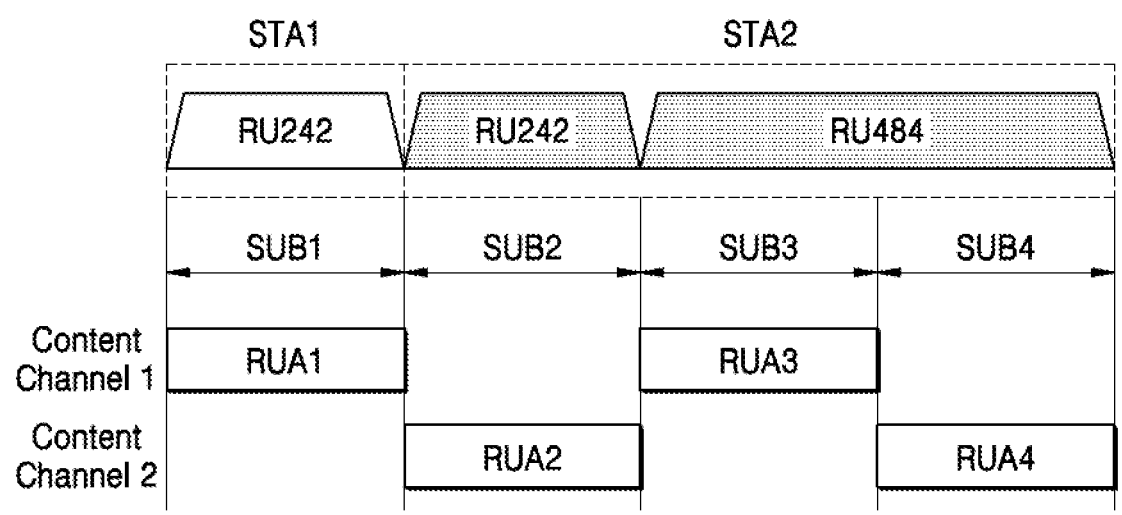

FIGS. 6A and 6B are diagrams showing examples of RUs allocated according to example embodiments of the inventive concept. FIG. 6A shows examples of RUs allocated in the 20 MHz bandwidth, and FIG. 6B shows examples of RUs allocated in the 80 MHz bandwidth.

Referring to FIG. 6A, a "small RU" and/or a "small MRU" may be allocated to stations. One example of a small RU is an RU that has no more than a smallest predetermined number of tones, such as 26 tones. For example, a 26-tone RU RU26 may be allocated to each of a first station STA1, a third station STA3, and a fifth station STA5. Also, an MRU including a 26-tone RU RU26 and a 52-tone RU RU52 may be allocated to each of a second station STA2 and a fourth station STA4. An RU allocation sub-field may correspond to a sub-channel of 20 MHz as described above with reference to FIG. 3A, and thus a common field in the 20 MHz bandwidth of FIG. 6A may include one RU allocation sub-field RUA in a first "content channel". Referring to FIG. 5B, the RU allocation sub-field RUA of FIG. 6A may have a binary value '000110110'.

Referring to FIG. 6B, a "large RU" and/or a "large MRU" may be allocated to stations. A large RU/MRU has more tones than a smallest predetermined number of tones for any RU. Some examples of a large RU/large MRU are frequency ranges encompassing 242 tones, 484 tones and 996 tones, respectively. For example, a 242-tone RU RU242 may be allocated to the first station STA1, and an MRU including a 242-tone RU RU242 and a 484-tone RU RU484 may be allocated to the second station STA2. In the 80 MHz bandwidth of FIG. 6B, a common field may include two RU allocation sub-fields RUAs, e.g., first and third RU allocation sub-fields RUA1 and RUA3 in the first content channel. The 80 MHz bandwidth may further include two other RU allocation sub-fields RUA, e.g., second and fourth RU allocation sub-fields RUA2 and RUA4 in a second content channel. Referring to FIG. 5B, a first RU allocation sub-field RUA1 may have a binary value '001000000' corresponding to a 242-tone RU RU242. Also, referring to FIG. 5C, one RU allocation sub-field from among second to fourth RU allocation sub-field RUA2 to RUA4 may have a binary value '001100000' corresponding to an MRU '[ ]-242-484'. Meanwhile, the remaining two RU allocation sub-field may each have a value indicating zero user.

As described below, an RU allocation sub-field "indicating zero user" may have a binary value indicating an RU including a "zero user sub-channel". A "zero user sub-channel" is a sub-channel within an overall bandwidth supported by the AP for the wireless communication, and in some cases may be just a portion of an RU frequency band or an MRU frequency band. A zero user sub-channel may be understood by the receiving device as a sub-channel that is not allocated to any users and is not currently used for data transmission of any communication signals between the transmitting and receiving devices. A zero user sub-channel may be a "punctured" sub-channel, which is a punctured range of frequencies within a bandwidth supported by an AP. For example, in the example of FIG. 6B, the value of a third RU allocation sub-field RUA3 corresponding to a third sub-channel SUB3 when a second RU allocation sub-field RUA2 has a binary value '001100000' may be different from the value of the second RU allocation sub-field RUA2 corresponding to a second sub-channel SUB2 when the third RU allocation sub-field RU3 has a binary value '001100000'. Therefore, the first station STA1 and/or the second station STA2 may easily identify an RU (e.g., an RU included in an MRU) from an RU allocation sub-field and may easily identify locations of pilot subcarriers depending on the RU. Pilot subcarriers may be used to transmit a known data sequence and may be used to determine an error between an ideal signal and an actually received signal. A determined error may be used to compensate for a received signal. As described above, the utilization of pilot subcarriers may be improved due to the easily identifiable pilot subcarriers and the increased number of pilot subcarriers, and the first station STA1 and/or the second station STA2 may process signals received from an AP more easily and accurately.

Figure 7:
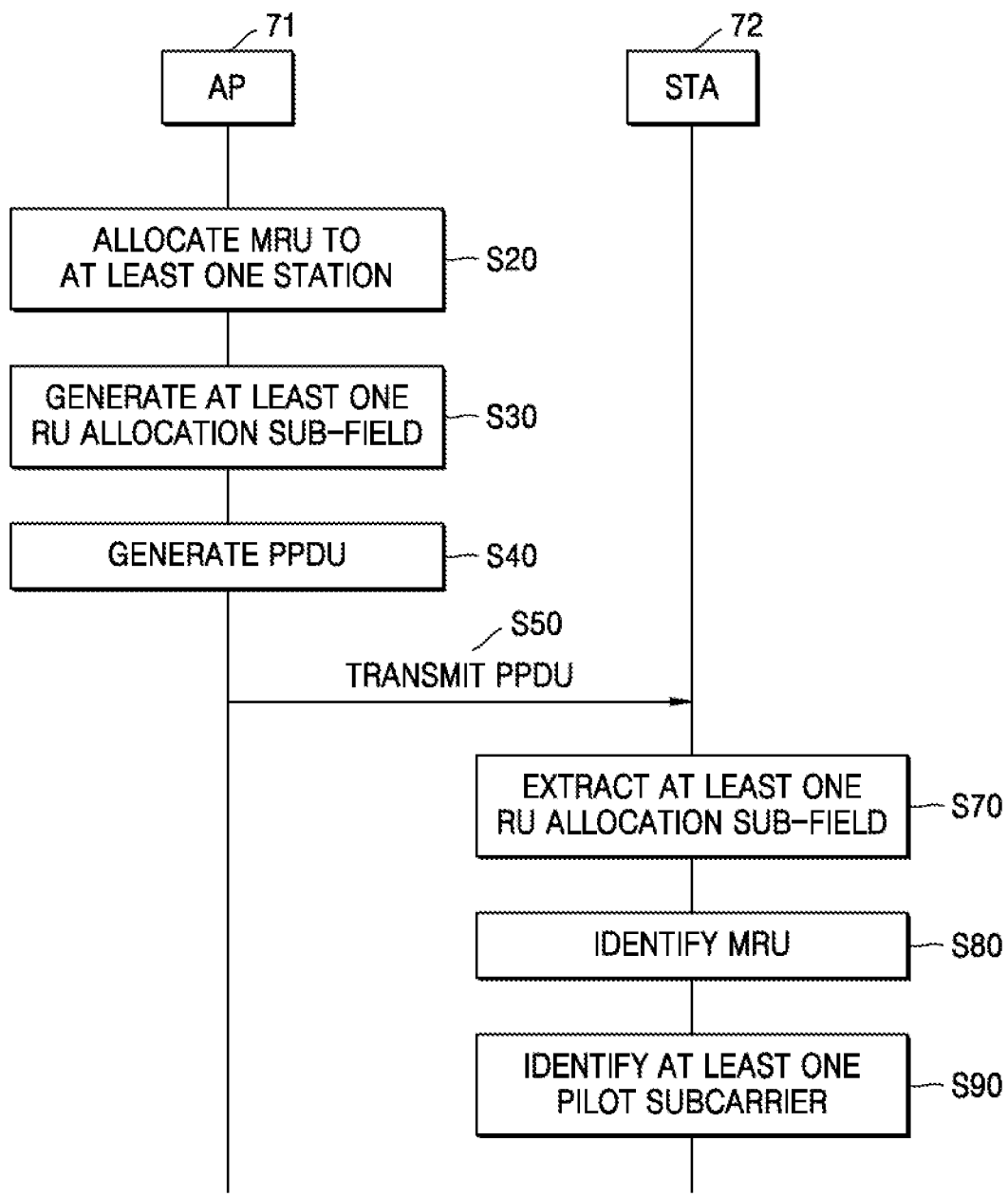
FIG. 7 is a message diagram showing a method for communication based on a multi-resource unit (MRU) according to an example embodiment of the inventive concept.

FIG. 7 is a control frame generation and signaling diagram showing a method for communication based on a multi-resource unit (MRU) according to an example embodiment of the inventive concept. As shown in FIG. 7, the method for communication based on an MRU may include a plurality of operations S20, S30, S40, S50, S70, S80, and S90.

In operation S20, an AP 71 may allocate an MRU to at least one station. The AP 71 may achieve high spectral efficiency as well as high throughput by allocating an MRU to at least one station. Hereinafter, it is assumed that the AP 71 allocates a large MRU to a station 72.

In operation S30, the AP 71 may generate at least one RU allocation sub-field. As described above with reference to FIG. 3A, the AP 71 may generate RU allocation sub-fields respectively corresponding to sub-channels included in a bandwidth. For example, when a large MRU is allocated in operation S20, the bandwidth may be 80 MHz or greater, and the AP 71 may generate four or more RU allocation sub-fields. Examples of operation S30 will be described later with reference to FIGS. 8 and 16.

In operation S40, the AP 71 may generate a PPDU. For example, as described above with reference to FIG. 3A, the AP 71 may generate an EHT-SIG field including at least one RU allocation sub-field generated in operation S30 in a common field and may generate an EHT MU PPDU including the EHT-SIG field in a preamble. In operation S50, the AP 71 may transmit a PPDU to the station 72, and the station 72 may receive the PPDU from the AP 71.

In operation S70, the station 72 may extract at least one RU allocation sub-field. For example, the station 72 may extract the EHT-SIG field from the preamble of the PPDU received in operation S50 and extract at least one RU allocation sub-field from the common field of the EHT-SIG field.

In operation S80, the station 72 may identify an MRU. For example, the station 72 may identify the MRU allocated by the AP 71 in operation S20, based on the at least one RU allocation sub-field extracted in operation S70. As described above with reference to FIG. 6B, the at least one RU allocation sub-field extracted in operation S70 may include an RU allocation sub-field indicating an RU including a sub-channel corresponding to the RU allocation sub-field as well as a sub-channel corresponding to zero user, and the station 72 may easily identify an RU included in the MRU allocated by the AP 71 in operation S20. An example of operation S80 will be described later with reference to FIG. 13.

In operation S90, the station 72 may identify at least one pilot subcarrier. For example, the station 72 may identify at least one pilot subcarrier based on RUs included in the MRU identified in operation S80. The station 72 may easily and accurately process a signal received from the AP 71 based on the identified at least one pilot subcarrier.

Figure 8:
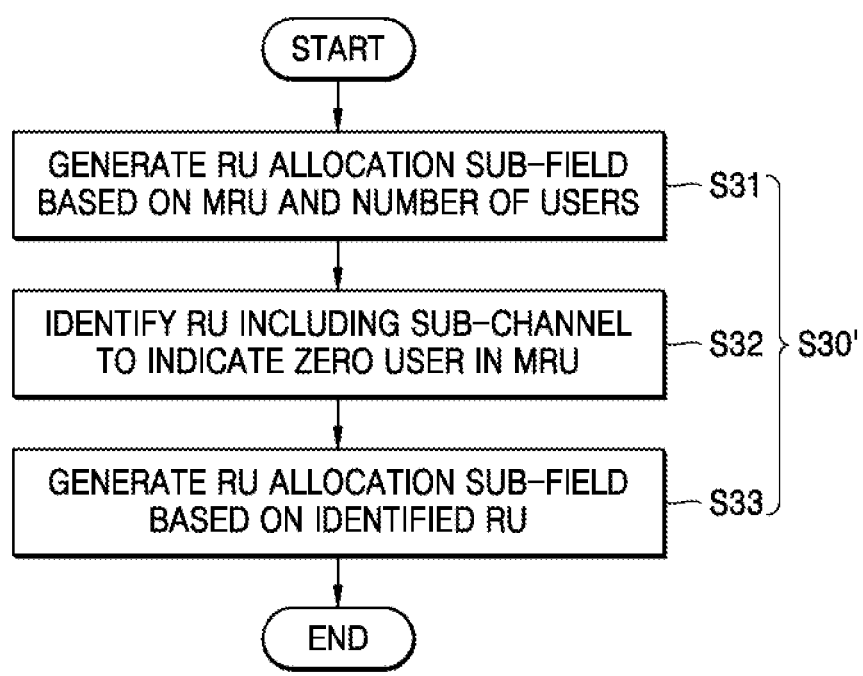
FIG. 8 is a flowchart of a method for communication based on an MRU according to an example embodiment of the inventive concept.

FIG. 8 is a flowchart of a method for communication based on an MRU according to an example embodiment of the inventive concept. The flowchart of FIG. 8 shows an example of operation S30 of FIG. 7. As described above with reference to FIG. 7, at least one RU allocation sub-field corresponding to an MRU may be generated in operation S30' of FIG. 8. Operation S30' may include a plurality of operations S31, S32, and S33. Hereinafter, it is assumed that the AP 71 of FIG. 7 allocates the MRU of FIG. 6B including a 242-tone RU RU242 and a 484-tone RU RU484 in operation S20 of FIG. 7, and FIG. 8 will be described with reference to FIGS. 6B and 7.

In operation S31, an RU allocation sub-field may be generated based on an MRU and the number of users. In some embodiments, the AP 71 may generate an RU allocation sub-field having a value corresponding to the MRU allocated in operation S20 of FIG. 7 and the number of MU-MIMO users by referring to the tables shown in FIGS. 5A, 5B, and 5C. For example, the AP 71 may generate the second RU allocation sub-field RUA2, the third RU allocation sub-field RUA3, or the fourth RU allocation sub-field RUA4 of FIG. 6B having a binary value '001100000' (e.g., 001100y2y1y0 corresponding to "MRU of [ ]-242-484" in FIG. 5C, where y2, y1 and y0 are each "0").

In operation S32, an RU including a sub-channel to indicate zero user in the MRU may be identified. In some embodiments, the AP 71 may identify a sub-channel to indicate zero user from among sub-channels included in the MRU and may identify an RU including the identified sub-channel. For example, when the AP 71 generates the second RU allocation sub-field RUA2 having a binary value '001000000' in operation S31, the AP 71 may identify third and fourth sub-channels SUB3 and SUB4 to indicate zero user and may identify third and fourth RU allocation sub-fields RUA3 and RUA4. Also, when the AP 71 generates the third RU allocation sub-field RUA3 having a binary value '001000000' in operation S31, the AP 71 may identify second and fourth sub-channels SUB2 and SUB4 to indicate zero user and may identify second and fourth RU allocation sub-fields RUA2 and RUA4.

In operation S33, an RU allocation sub-field may be generated based on an identified RU. In some embodiments, the AP 71 may set the value of an RU allocation sub-field indicating zero user to a value dependent on the RU identified in operation S32. For example, the value of the second RU allocation sub-field RUA2 indicating zero user and the value of the fourth RU allocation sub-field RUA4 indicating zero user may be different. Examples of operation S33 will be described later with reference to FIGS. 10 and 12.

Figure 10:
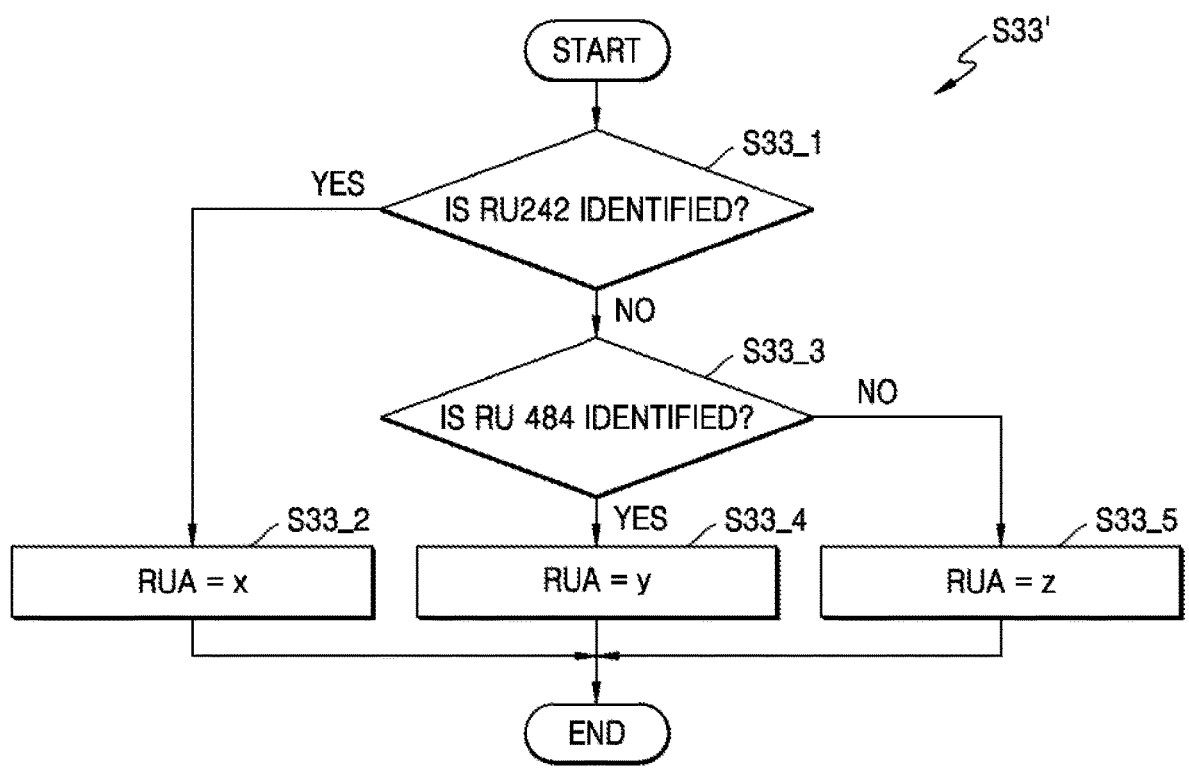
FIG. 10 is a flowchart of a method for communication based on the RU allocation indexing of FIG. 9, according to example embodiments of the inventive concept.

FIG. 9 is a diagram showing an RU allocation indexing according to an example embodiment of the inventive concept, and FIG. 10 is a flowchart of a method for communication based on the RU allocation indexing of FIG. 9, according to example embodiments of the inventive concept. In detail, FIG. 9 shows examples of entries that may be included in the table shown in FIGS. 5A to 5C, and the flowchart of FIG. 10 shows an example of operation S33 of FIG. 8. Hereinafter, FIGS. 9 and 10 will be described with reference to FIGS. 6B and 7.

Referring to FIG. 9, an RU allocation sub-field may have a different value according to an RU in which a sub-channel indicating zero user is included. For example, as shown in FIG. 9, an RU allocation sub-field corresponding to a sub-channel included in a 242-tone RU RU242 may have a value 'x' to indicate zero user, an RU allocation sub-field corresponding to a sub-channel included in a 484-tone RU RU484 may have a value 'y' to indicate zero user, and an RU allocation sub-field corresponding to a sub-channel included in a 996-tone RU RU996 may have a value 'z' to indicate zero user. Therefore, in the example of FIG. 6B, when the second RU allocation sub-field RUA2 has a binary value '001000000', the third and fourth RU allocation sub-fields RUA3 and RUA4 may each have the value 'y'. Also, in the example of FIG. 6B, when the third RU allocation sub-field RUA3 has a binary value '001000000', the second and fourth RU allocation sub-fields RUA2 and RUA4 may have the value 'x' and the value 'y', respectively. In some embodiments, the values 'x', 'y', and 'z' of FIG. 9 may correspond to the three binary values '000011100', '000011101', and '000011110' in the table of FIG. 5A, respectively.

Referring to FIG. 10, operation S33' may include a plurality of operations S33_1 to S33_5. As described above with reference to FIG. 8, in operation S33' of FIG. 10, an RU allocation sub-field may be generated based on an identified RU. In operation S33_1, the AP 71 may determine whether an identified RU is a 242-tone RU RU242. As shown in FIG. 10, when the identified RU is the 242-tone RU RU242, in operation S33_2, the AP 71 may set an RU allocation sub-field RUA to the value 'x'. For example, to indicate zero user in a 242-tone RU RU242 of a single RU and a 242-tone RU RU242 of an MRU including a 484-tone RU RU484 and the 242-tone RU RU242, the RU allocation sub-field RUA may be set to the value 'x'.

When the identified RU is not the 242-tone RU RU242, in operation S33_3, the AP 71 may determine whether the identified RU is a 484-tone RU RU484. As shown in FIG. 10, when the identified RU is the 484-tone RU RU242, in operation S33_4, the AP 71 may set the RU allocation sub-field RUA to the value 'y'. For example, to indicate zero user in a 484-tone RU RU484 of a single RU, a 484-tone RU RU484 of an MRU including the 484-tone RU RU484 and a 242-tone RU RU242, a 484-tone RU RU484 of an MRU including a 996-tone RU RU996 and the 484-tone RU RU484, a 484-tone RU RU484 of an MRU including two 996-tone RUs RU996 and the 484-tone RU RU484, and a 484-tone RU RU484 of an MRU including three 996-tone RUs RU996 and the 484-tone RU RU484, the RU allocation sub-field RUA may be set to the value 'y'.

When the identified RU is not the 242-tone RU RU242 (i.e., when the identified RU is a 996-tone RU RU996), in operation S33_5, the AP 71 may set the RU allocation sub-field RUA to the value 'z'. For example, to indicate zero user in a 996-tone RU RU996 of a single RU, a 996-tone RU RU996 of an MRU including the 996-tone RU RU996 and a 484-tone RU RU484, a 996-tone RU RU996 of an MRU including two 996-tone RUs RU996, a 996-tone RU RU996 of an MRU including two 996-tone RUs RU996 and a 484-tone RU RU484, a 996-tone RU RU996 of an MRU including three 996-tone RUs RU996, and a 996-tone RU RU996 of an MRU including three 996-tone RUs RU996 and a 484-tone RU RU484, the RU allocation sub-field RUA may be set to the value 'z'.

FIG. 11 is a diagram showing an RU allocation indexing according to an example embodiment of the inventive concept, and FIG. 12 is a flowchart of a method for communication based on the RU allocation indexing of FIG. 11, according to example embodiments of the inventive concept. In detail, FIG. 11 shows examples of entries that may be included in the table shown in FIGS. 5A to 5C, and the flowchart of FIG. 12 shows an example of operation S33 of FIG. 8. Hereinafter, FIGS. 11 and 12 will be described with reference to FIGS. 6B and 7.

Referring to FIG. 11, an RU allocation sub-field may have a common value for different RUs in which sub-channels indicating zero user are included. For example, pilot sub-carriers disposed in a 242-tone RU RU242 and a 484-tone RU RU484 in a bandwidth of 40 MHz or greater may exist at the same locations. Therefore, as shown in FIG. 11, an RU allocation sub-field corresponding to a sub-channel included in a 242-tone RU RU242 or a 484-tone RU RU484 may have the value 'x' to indicate zero user, and an RU allocation sub-field corresponding to a sub-channel included in a 996-tone RU RU996 may have the value 'y' to indicate zero user. For example, in the example of FIG. 6B, from among the second to fourth RU allocation sub-fields RUA2 to RUA4, RU allocation sub-fields indicating zero user may have the value 'x' in common. Therefore, compared with the RU allocation indexing of FIG. 9, the number of valid entries included in a table may be reduced in the example of FIG. 11.

Referring to FIG. 12, operation S33" may include a plurality of operations S33_6 to S33_8. As described above with reference to FIG. 8, in operation S33" of FIG. 12, an RU allocation sub-field may be generated based on an identified RU. In operation S33_6, the AP 71 may determine whether an identified RU is a 242-tone RU RU242 or a 484-tone RU RU484. As shown in FIG. 12, when the identified RU is a 242-tone RU RU242 or a 484-tone RU RU484, in operation S33_7, the AP 71 may set an RU allocation sub-field RUA to the value 'x'. When the identified RU is not the 242-tone RU RU242 or the 484-tone RU RU484 (i.e., when the identified RU is a 996-tone RU RU996), in operation S33_8, the AP 71 may set the RU allocation sub-field RUA to the value 'y'.

Figure 13:
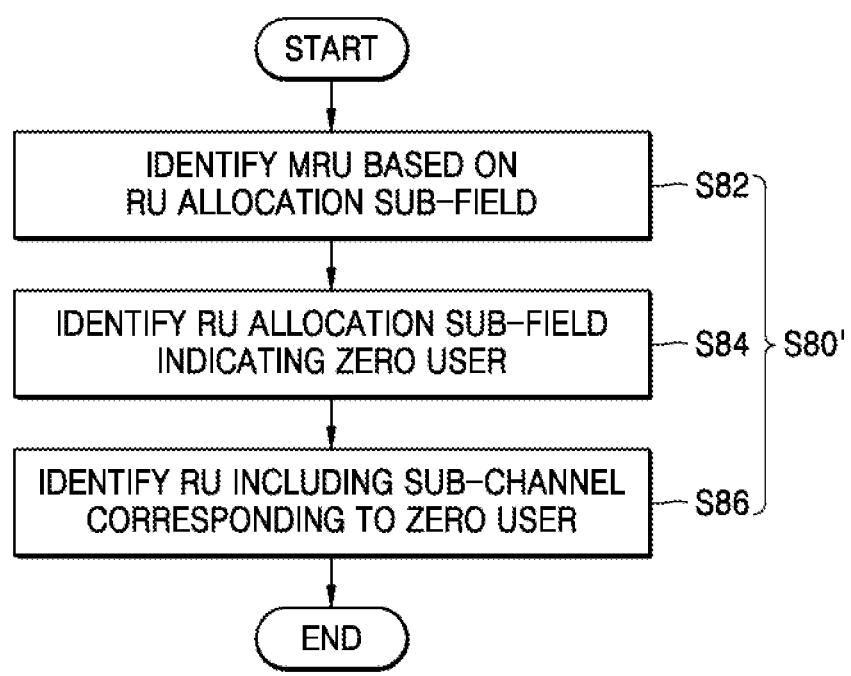
FIG. 13 is a flowchart of a method for communication based on an MRU according to an example embodiment of the inventive concept.

FIG. 13 is a flowchart of a method for communication based on an MRU according to an example embodiment of the inventive concept. In detail, the flowchart of FIG. 13 shows an example of operation S80 of FIG. 7. As described above with reference to FIG. 7, an MRU may be identified in operation S80' of FIG. 13. As shown in FIG. 13, operation S80' may include a plurality of operations S82, S84, and S86. Hereinafter, it is assumed that the AP 71 of FIG. 7 allocates the MRU of FIG. 6B including a 242-tone RU RU242 and a 484-tone RU RU484 in operation S20 of FIG. 7, and FIG. 13 will be described with reference to FIGS. 6B and 7.

Referring to FIG. 13, in operation S82, an MRU may be identified based on an RU allocation sub-field. In some embodiments, the station 72 may refer to the table shown in FIGS. 5A, 5B, and 5C and identify an MRU corresponding to the value of the at least one RU allocation sub-field extracted in operation S70 of FIG. 7 and identify the number of MU-MIMO users. For example, the station 72 may identify the MRU of FIG. 6B based on an RU allocation sub-field having the binary value '001000000'.

In operation S84, an RU allocation sub-field indicating zero user may be identified. In some embodiments, the station 72 may identify an RU allocation sub-field having a value indicating zero user from among at least one RU allocation sub-field extracted in operation S70 of FIG. 7 based on the RU allocation indexing shown in FIG. 9 or 11. For example, the station 72 may identify two RU allocation sub-fields indicating zero user from among the second to fourth RU allocation sub-fields RUA2 to RUA4 of FIG. 6B.

In operation S86, an RU including a sub-channel corresponding to zero user may be identified. In some embodiments, the station 72 may identify an RU indicated by the RU allocation sub-field identified in operation S84 based on the RU allocation indexing shown in FIG. 9 or 11. For example, the station 72 may identify a 242-tone RU RU242 or a 484-tone RU RU484 from an RU allocation sub-field indicating zero users from among the second to fourth RU allocation sub-fields RUA2 to RUA4. As described above with reference to FIG. 7, locations of pilot subcarriers may be identified based on the RU identified in operation S86. Examples of operation S86 will be described later with reference to FIGS. 14A and 14B.

In some embodiments, unlike as shown in FIG. 13, operations S84 and S86 may be performed in parallel or may be combined into a single operation. For example, the station 72 may simultaneously identify zero user and an RU including a sub-channel corresponding to zero user from the value of the RU allocation sub-field extracted in operation S70 of FIG. 7 based on the RU allocation indexing shown in FIG. 9 or 11.

Figure 14A:
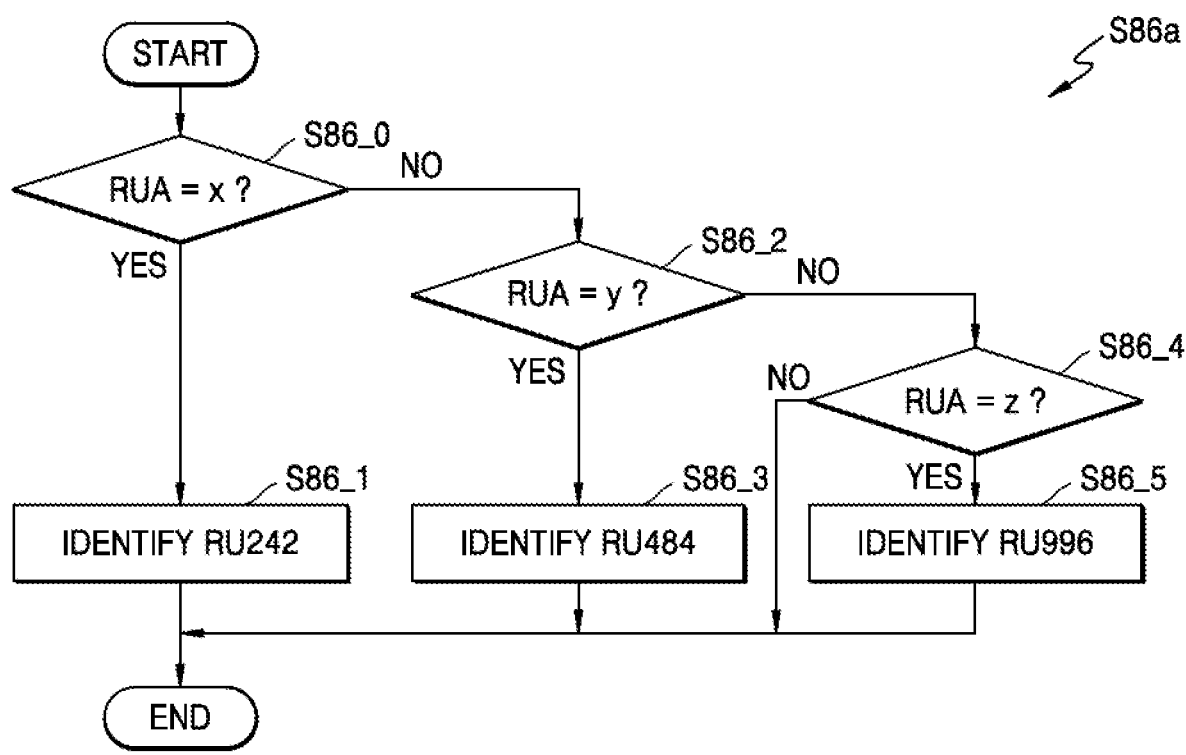
FIGS. 14A and 14B are flowcharts of a method for communication based on an MRU according to an example embodiment of the inventive concept.
Figure 14B:
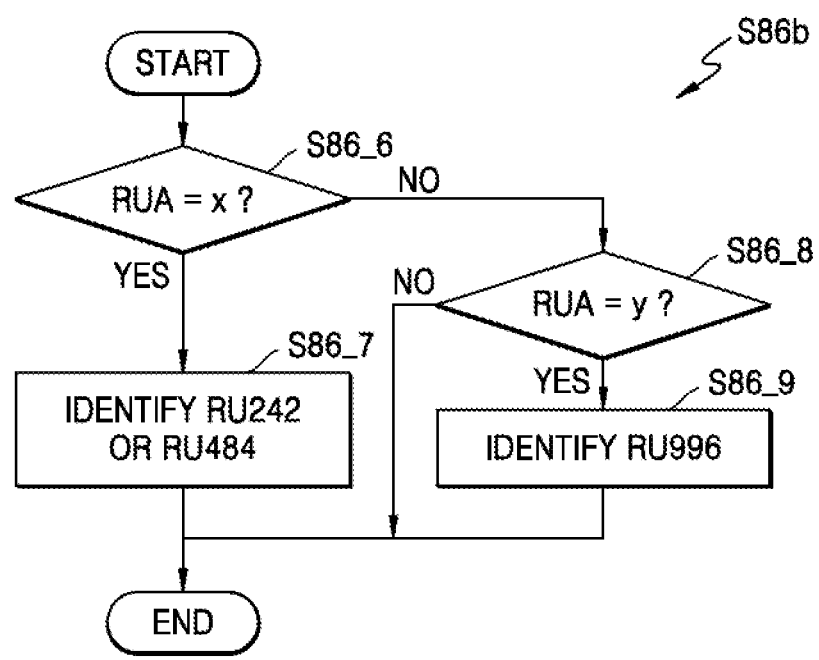

FIGS. 14A and 14B are flowcharts of a method for communication based on an MRU according to an example embodiment of the inventive concept. In detail, the flow-charts of FIGS. 14A and 14B show examples of operation S86 of FIG. 13. In operation S86a of FIG. 14A, an RU including a sub-channel corresponding to zero user may be identified based on the RU allocation indexing of FIG. 9, and, in operation S86b of FIG. 14B, an RU including a sub-channel corresponding to zero user may be identified based on the RU allocation indexing of FIG. 11. Hereinafter, FIGS. 14A and 14B will be described with reference to FIGS. 6B, 7, 9, and 11.

Referring to FIG. 14A, operation S86a may include a plurality of operations S86_0 to S86_5. In operation S86_0, it may be determined whether the value of an RU allocation sub-field RUA is 'x'. For example, the station 72 may determine whether the value of the RU allocation sub-field RUA identified in operation S84 of FIG. 13 matches the value 'x'. As shown in FIG. 14A, when the value of the RU allocation sub-field RUA is 'x', in operation S86_1, the station 72 may identify a 242-tone RU RU242 including a sub-channel corresponding to an RU allocation sub-field RUA indicating zero user.

When the value of the RU allocation sub-field RUA is not 'x', it may be determined whether the value of the RU allocation sub-field RUA is 'y' in operation S86_2. As shown in FIG. 14A, when the value of the RU allocation sub-field RUA is 'y', in operation S86_3, the station 72 may identify a 484-tone RU RU484 including a sub-channel corresponding to an RU allocation sub-field RUA indicating zero user.

When the value of the RU allocation sub-field RUA is not 'y', it may be determined whether the value of the RU allocation sub-field RUA is 'z' in operation S86_4. As shown in FIG. 14A, when the value of the RU allocation sub-field RUA is 'z', in operation S86_5, the station 72 may identify a 996-tone RU RU996 including a sub-channel corresponding to an RU allocation sub-field RUA indicating zero user. On the other hand, when the value of the RU allocation sub-field RUA is not 'z', operation S86a may be terminated.

Referring to FIG. 14B, operation S86b may include a plurality of operations S86_6 to S86_9. In operation S86_6, it may be determined whether the value of an RU allocation sub-field RUA is 'x'. For example, the station 72 may determine whether the value of the RU allocation sub-field RUA identified in operation S84 of FIG. 13 matches the value 'x'. As shown in FIG. 14B, when the value of the RU allocation sub-field RUA is 'x', in operation S86_7, the station 72 may identify a 242-tone RU RU242 or a 484-tone RU RU484 including a sub-channel corresponding to an RU allocation sub-field RUA indicating zero user.

When the value of the RU allocation sub-field RUA is not 'x', it may be determined whether the value of the RU allocation sub-field RUA is 'y' in operation S86_8. As shown in FIG. 14B, when the value of the RU allocation sub-field RUA is 'y', in operation S86_9, the station 72 may identify a 996-tone RU RU996 including a sub-channel corresponding to an RU allocation sub-field RUA indicating zero user. On the other hand, when the value of the RU allocation sub-field RUA is not 'y', operation S86b may be terminated.

Figure 16:
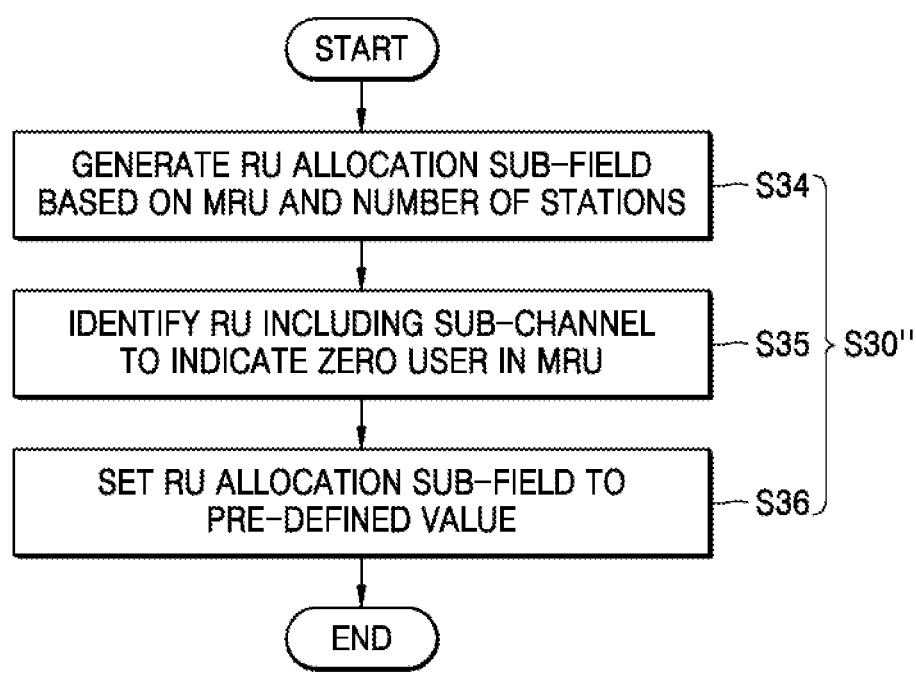
FIG. 16 is a flowchart of a method for communication based on the RU allocation indexing of FIG. 15, according to example embodiments of the inventive concept.

FIG. 15 is a diagram showing an RU allocation indexing according to an example embodiment of the inventive concept, and FIG. 16 is a flowchart of a method for communication based on the RU allocation indexing of FIG. 15, according to example embodiments of the inventive concept. In detail, FIG. 15 shows examples of entries that may be included in the table shown in FIGS. 5A to 5C, and the flowchart of FIG. 16 shows an example of operation S30 of FIG. 7. Hereinafter, FIGS. 15 and 16 will be described with reference to FIGS. 6B and 7.

Referring to FIG. 15, an RU allocation sub-field may have a value dedicated to indicate zero user in a sub-channel included in an MRU. In other words, a station may identify an MRU from an RU allocation sub-field indicating non-zero user and may identify zero user from an RU allocation sub-field having a value 'w' in the MRU. For example, as shown in FIG. 15, an RU allocation sub-field corresponding to a sub-channel included in a 242-tone RU RU242 as a single RU may have a value 'x' to indicate zero user, an RU allocation sub-field corresponding to a sub-channel included in a 484-tone RU RU484 as a single RU may have a value 'y' to indicate zero user, and an RU allocation sub-field corresponding to a sub-channel included in a 996-tone RU RU996 as a single RU may have a value 'z' to indicate zero user. Also, an RU allocation sub-field corresponding to a sub-channel included in an MRU may have a value 'w' to indicate zero user. Therefore, in the example of FIG. 6B, two RU allocation sub-fields from among the second to fourth RU allocation sub-fields RUA2 to RUA4 may have the value 'w' in common.

Referring to FIG. 16, operation S30" may include a plurality of operations S34, S35, and S36. As described above with reference to FIG. 7, at least one RU allocation sub-field may be generated in operation S30" of FIG. 16. Hereinafter, it is assumed that the AP 71 of FIG. 7 allocates the MRU of FIG. 6B including a 242-tone RU RU242 and a 484-tone RU RU484 in operation S20 of FIG. 7.

In operation S34, an RU allocation sub-field may be generated based on an MRU and the number of stations. In some embodiments, the AP 71 may generate an RU allocation sub-field having a value corresponding to the MRU allocated in operation S20 of FIG. 7 and the number of MU-MIMO users by referring to the tables shown in FIGS. 5A, 5B, and 5C. For example, the AP 71 may generate the second RU allocation sub-field RUA2, the third RU allocation sub-field RUA3, or the fourth RU allocation sub-field RUA4 of FIG. 6B having a binary value '001000000'.

In operation S35, an RU including a sub-channel to indicate zero user in the MRU may be identified. In some embodiments, the AP 71 may identify a sub-channel to indicate zero user from among sub-channels included in the MRU and may identify an RU including the identified sub-channel. For example, when the AP 71 generates the second RU allocation sub-field RUA2 having a binary value '001000000' in operation S34, the AP 71 may identify third and fourth sub-channels SUB3 and SUB4 to indicate zero user and may identify third and fourth RU allocation sub-fields RUA3 and RUA4. Also, when the AP 71 generates the third RU allocation sub-field RUA3 having a binary value '001000000' in operation S31, the AP 71 may identify second and fourth sub-channels SUB2 and SUB4 to indicate zero user and may identify second and fourth RU allocation sub-fields RUA2 and RUA4.

In operation S36, an RU allocation sub-field may be set to a pre-defined value. In some embodiments, the AP 71 may set the RU identified in operation S35 to a pre-defined value, that is, the value 'w' of FIG. 15.

Figure 18:
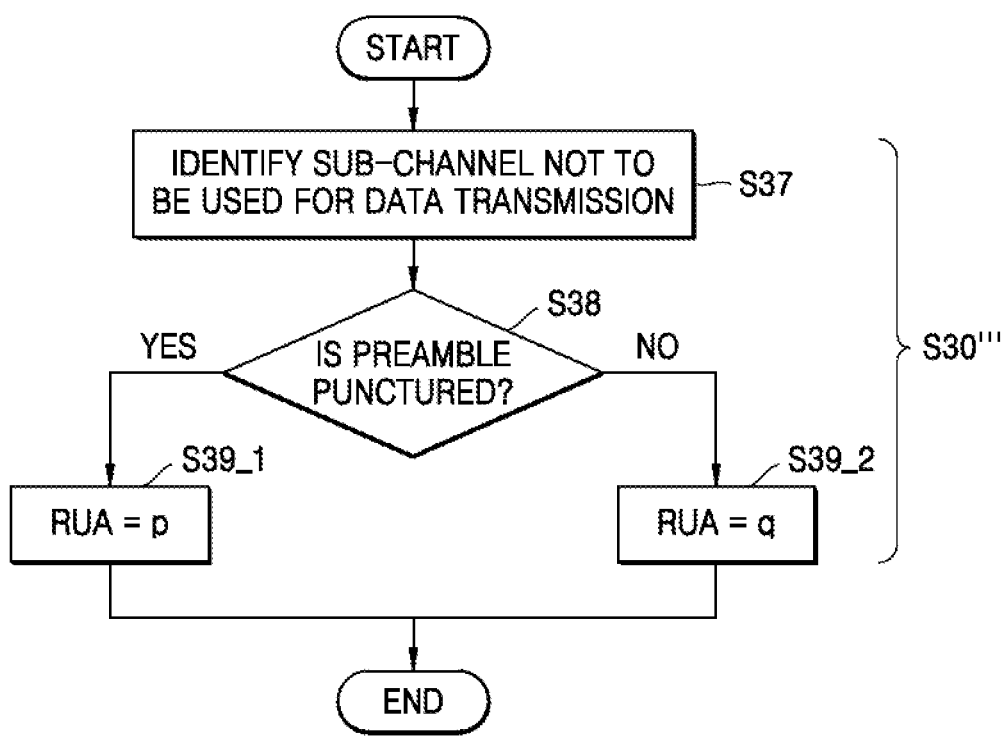
FIG. 18 is a flowchart of a method for communication based on the RU allocation indexing of FIG. 17, according to example embodiments of the inventive concept.

FIG. 17 is a diagram showing an RU allocation indexing according to an example embodiment of the inventive concept, and FIG. 18 is a flowchart of a method for communication based on the RU allocation indexing of FIG. 17, according to example embodiments of the inventive concept. In detail, FIG. 17 shows examples of entries that may be included in the table shown in FIGS. 5A to 5C, and the flowchart of FIG. 18 shows an example of operation S30 of FIG. 7. Hereinafter, FIGS. 17 and 18 will be described with reference to FIG. 7.

Referring to FIG. 17, an RU allocation sub-field may have a value for indicating a sub-channel or an RU corresponding to a width of the sub-channel that is not used for data transmission, wherein the value may vary depending on whether a preamble is punctured. For example, as shown in FIG. 17, when a sub-channel (i.e., 20 MHz) or a 242-tone RU RU242 corresponding to an RU allocation sub-field is not used for data transmission and a preamble of the corresponding sub-channel is punctured, the RU allocation sub-field may have a value 'p'. Also, when the sub-channel or the 242-tone RU RU242 corresponding to the RU allocation sub-field RUA is not used for data transmission and the preamble of the corresponding sub-channel is not punctured, the RU allocation sub-field may have a value 'q'. In some embodiments, values 'p' and 'q' of FIG. 17 may correspond to binary values '000011010' and '000011011' in the table of FIG. 5A, respectively.

Referring to FIG. 18, operation S30' may include a plurality of operations S37, S38, S39_1, and S39_2. As described above with reference to FIG. 7, at least one RU allocation sub-field may be generated in operation S30" of FIG. 18.

In operation S37, a sub-channel not to be used for data transmission may be identified. For example, the AP 71 may not use at least one of sub-channels included in a bandwidth for data transmission. Therefore, the AP 71 may identify the location of an RU (i.e., a 242-tone RU) corresponding to the identified sub-channel.

In operation S38, it may be determined whether a preamble is punctured. In some embodiments, the AP 71 may determine whether the preamble of the sub-channel identified in operation S37 includes information. For example, the AP 71 may include information in the preamble without using the 242-tone RU identified in operation S37 for data transmission or the preamble may also be punctured. As shown in FIG. 18, when the preamble is punctured, in operation S39_1, an RU allocation sub-field RUA may be set to the value 'p'. When the preamble is not punctured, the RU allocation sub-field RUA may be set to the value 'q'.

Figure 19:
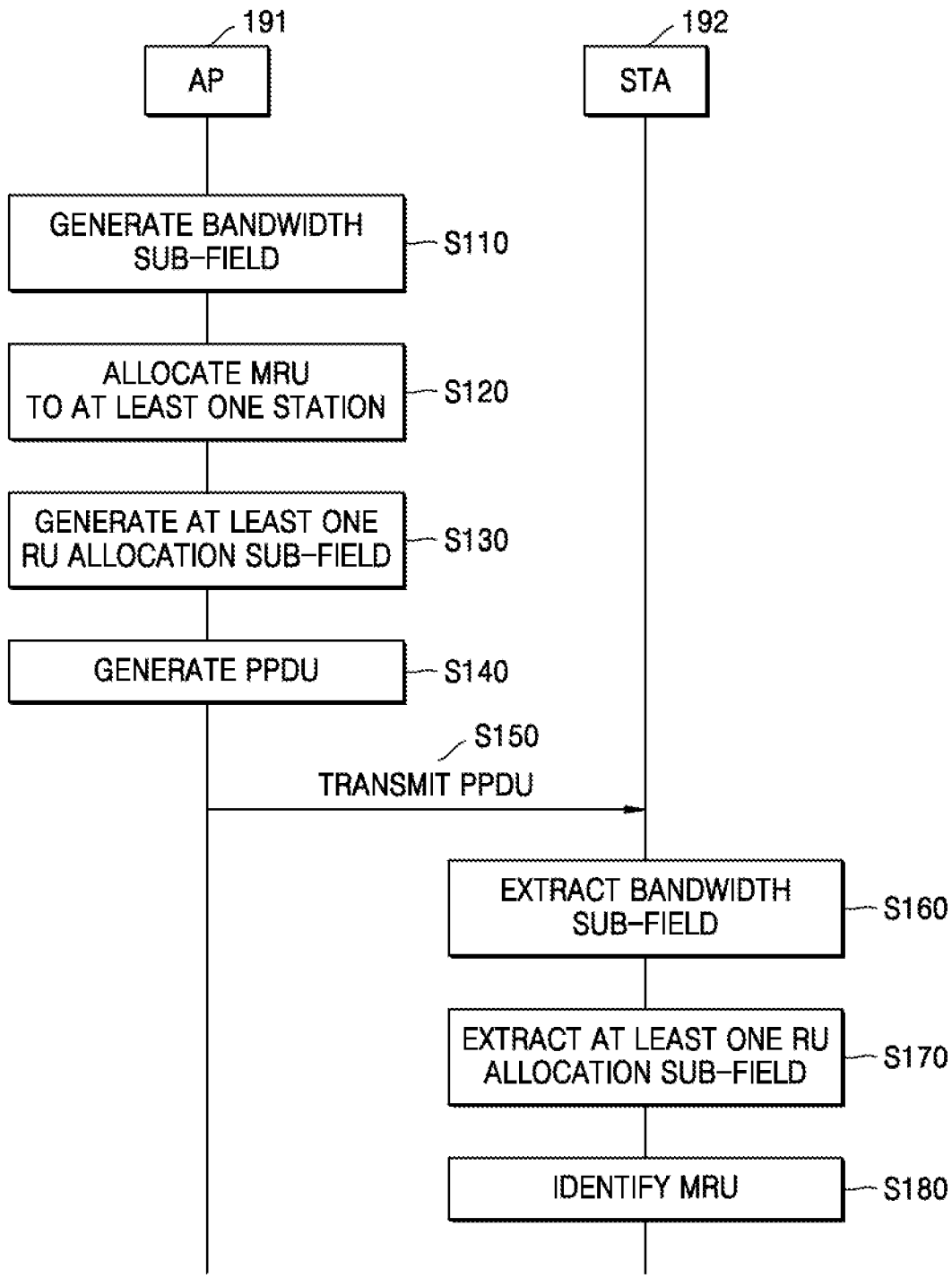
FIG. 19 is a message diagram showing a method for communication based on an MRU according to an example embodiment of the inventive concept.

FIG. 19 is a control and signaling diagram illustrating a method for communication based on an MRU according to an example embodiment of the inventive concept. The method may include a plurality of operations S110 to S180. Hereinafter, redundant description of features described with reference to FIG. 7 will be omitted.

In operation S110, an AP 191 may generate a "bandwidth sub-field" such as a PPDU bandwidth sub-field. For example, the AP 191 may determine a bandwidth to be used for communication with at least one station including a station 192 after obtaining a transmit opportunity (TXOP) and, based on the determined bandwidth, may generate the bandwidth sub-field. In EHT, the AP 191 may generate a bandwidth sub-field having a value corresponding to 20 MHz, 40 MHz, 80 MHz, 160 MHz, or 320 MHz.

In operation S120, an AP 191 may allocate an MRU to at least one station. For example, the AP 191 may allocate an MRU to at least one station including the station 192 in the bandwidth determined in operation S110.

In operation S130, the AP 191 may generate at least one RU allocation sub-field. For example, the AP 191 may generate at least one RU allocation sub-field based on the bandwidth determined in operation S110 and the MRU allocated in operation S120. As described later with reference to FIGS. 20A and 20B, in the RU allocation indexing, one value may define different MRUs according to bandwidths, and thus the AP 191 may generate at least one RU allocation sub-field based on not only the MRU allocated in operation S120, but also the bandwidth determined in operation S110.

In operation S140, the AP 191 may generate a PPDU. For example, as described above with reference to FIG. 3A, the AP 191 may generate a U-SIG field including the bandwidth sub-field generated in operation S110 in version-dependent sub-fields and may generate an EHT-SIG field including the at least one RU allocation sub-field generated in operation S130 in a common field. The AP 191 may generate an EHT MU PPDU including the U-SIG field and the EHT-SIG field in a preamble. In operation S150, the AP 191 may transmit a PPDU to the station 192, and the station 192 may receive the PPDU from the AP 191.

In operation S160, the station 192 may extract a bandwidth field. For example, the station 192 may extract the U-SIG field from the preamble of the PPDU received in operation S150 and may extract the bandwidth sub-field from sub-fields dependent on the version of the U-SIG field.

In operation S170, the station 192 may extract at least one RU allocation sub-field. For example, the station 192 may extract the EHT-SIG field from the preamble of the PPDU received in operation S150 and extract at least one RU allocation sub-field from the common field of the EHT-SIG field.

In operation S180, the station 192 may identify an MRU. For example, the station 192 may identify the MRU allocated by the AP 191 in operation 120 based on the bandwidth sub-field extracted in operation S160 and the at least one RU allocation sub-field extracted in operation S170. The MRU may be identified based on not only the at least one RU allocation sub-field extracted in operation S170, but also the bandwidth sub-field extracted in operation S160. Therefore, as the number of indices of the RU allocation sub-field is reduced, the overhead for sharing RU allocation may be reduced and/or the number of supportable MRUs may increase, and thus the spectral efficiency and data rate may be improved.

FIGS. 20A and 20B are diagrams showing RU allocation indexing according to example embodiments of the inventive concept. In detail, FIGS. 20A and 20B show tables differently expressing the same RU allocation indexing. In FIGS. 20A and 20B, the first to k-th ranges R1 to Rk may correspond to n (e.g., sequential) values, respectively.

Referring to FIG. 20A, an RU allocation sub-field RUA may define different MRUs according to bandwidths with one value. For example, as shown in FIG. 20A, a first range R1 of the RU allocation sub-field may correspond to an MRU MRU1 in a first bandwidth BW1 and may correspond to an MRU MRU1' in a second bandwidth BW2. The second range R2 of the RU allocation sub-field may correspond to an MRU MRU2 in the first bandwidth BW1 and may correspond to the MRU MRU1 in the second bandwidth BW2. An i-th range Ri of the RU allocation sub-field may correspond to an MRU MRUi in the first bandwidth BW1 and may correspond to an MRU MRUi' in the second bandwidth BW2 (i is an integer greater than 1). A j-th range Rj of the RU allocation sub-field may correspond to an MRU MRUj, and a k-th range Rk of the RU allocation sub-field may correspond to an MRU MRUk. In other words, first to i-th ranges R1 to Ri of the RU allocation sub-field may each define different MRUs according to bandwidths. In some embodiments, the MRU MRUj and the MRU MRUk may include the same RUs as the MRU MRU1 and the MRU MRU2 (j=i+1, k=j+1). Also, in some embodiments, MRUs MRU1', MRU2', and MRUi' may be available only in the second bandwidth BW2.

Referring to FIG. 20B, the value of an RU allocation sub-field RUA may define different MRUs according to bandwidths. For example, as shown in FIG. 20B, in the second bandwidth BW2, the first to i-th ranges R1 to Ri of the RU allocation sub-field may define MRUs MRU1' to MRUi', respectively. Meanwhile, the first to i-th ranges R1 to Ri of the RU allocation sub-field in the first bandwidth BW1 may define MRUs MRU1 to MRUi, respectively.

Figure 21:
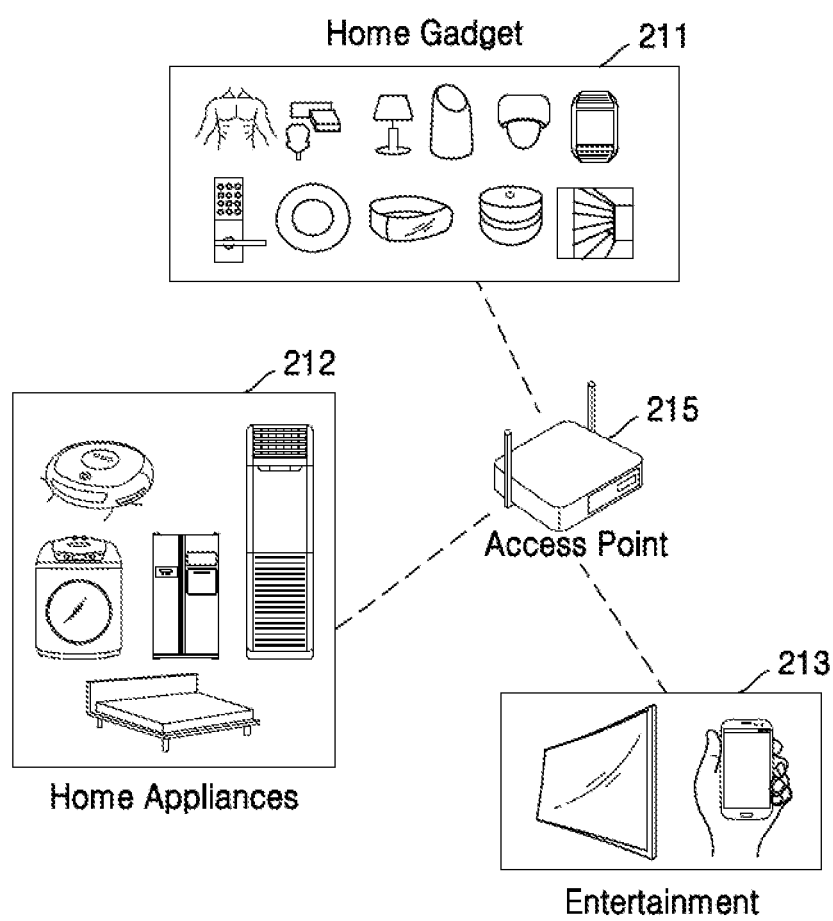
FIG. 21 is a diagram showing examples of devices for wireless communication according to an embodiment of the inventive concept.

FIG. 21 is a diagram showing examples of devices for wireless communication according to an embodiment of the inventive concept. FIG. 21 shows an Internet of Things (IoT)

network system including a home device 211, a home appliance 212, an entertainment device 213, and an AP 215.

In some embodiments, in a device for wireless communication of FIG. 21, communication based on an MRU described above with reference to the drawings may be performed. The AP 215 may generate an RU allocation sub-field based on an RU including a sub-channel indicating zero user and may transmit a PPDU including the RU allocation sub-field to the home device 211, the home appliance 212, and/or the entertainment device 213. Also, the home device 211, the home appliance 212, and/or the entertainment device 213 may easily identify zero user and the RU including a sub-channel indicating zero user based on an RU allocation sub-field included in the PPDU received from the AP 215 and identify pilot subcarriers based on the identified RU. Also, the AP 215, the home device 211, the home appliance 212, and/or the entertainment device 213 may generate or identify a value of an RU allocation sub-field representing different MRUs according to bandwidths. Therefore, the efficiency of the IoT network system may be improved.

Various functions described above may be implemented or supported by one or more computer programs, each of which is composed of computer readable program codes and executed on a non-transitory computer readable medium. The terms "application" and "program" refer to one or more computer programs, software components, instruction sets, procedures, functions, objects, classes, instances, related data, or portions thereof suitable for the implementation of suitable computer readable program codes. The term "computer readable program codes" includes all types of computer codes including source codes, object codes, and executable codes. The term "computer readable medium" includes all types of media that may be accessed by computers, such as a read only memory (ROM), a random access memory (RAM), a hard disk drive, a compact disk (CD), a digital video disk (DVD), or other types of memories. A "non-transitory" computer readable medium excludes wired, wireless, optical, or other types of communication links that transmit transitory electrical or other signals. The non-transitory computer readable medium includes a medium in which data may be permanently stored and a medium in which data may be stored and later overwritten, such as a rewritable optical disk or an erasable memory device.

While the inventive concept has been particularly shown and described with reference to embodiments thereof, it will be understood that various changes in form and details may be made therein without departing from the spirit and scope of the following claims.

What is claimed is:

1. A second device configured to communicate with a first device in a wireless local area network (WLAN), the second device comprising processing circuitry configured to:
   obtain resource unit (RU) allocation sub-fields and at least one user field from a physical layer protocol data unit (PPDU) received from the first device;
   identify a first RU allocation sub-field among the RU allocation sub-fields;
   identify a 242-tone RU (RU242) contributing zero user fields when the first RU allocation sub-field has a first value;
   identify a punctured RU242 when the first RU allocation sub-field has a second value; and
   identify an unassigned RU242 when the first RU allocation sub-field has a third value.

2. The second device of claim 1, wherein the processing circuitry is further configured to identify a second RU allocation sub-field having a fourth value among the RU allocation sub-fields, and
   the second RU allocation sub-field indicates a multi-resource unit (MRU) including the RU242 when the first RU allocation sub-field has the first value.

3. The second device of claim 2, wherein the MRU includes a 484-tone RU (RU484).

4. The second device of claim 3, wherein the second RU allocation sub-field indicates one MRU among a first MRU of [ ]-RU242-RU484, a second MRU of RU242-[ ]-RU484, a third MRU of RU484-[ ]-RU242 and a fourth MRU of RU484-RU242-[ ].

5. The second device of claim 2, wherein the fourth value indicates a number of devices allocated to the MRU by the first device.

6. The second device of claim 1, wherein the punctured RU242 and the unassigned RU242 are not allocated to any device.

7. The second device of claim 6, wherein the punctured RU242 includes unused frequencies to avoid interference, and
   wherein the unassigned RU242 has not yet been assigned to any device.

8. A method of communicating with a first device by a second device in a wireless local area network (WLAN), the method comprising:
   obtaining resource unit (RU) allocation sub-fields and at least one user field from a physical layer protocol data unit (PPDU) received from the first device; and
   identifying a first RU allocation sub-field having a first value among the RU allocation sub-fields,
   wherein the first RU allocation sub-field indicates: (i) a 242-tone RU (RU242) contributing zero user fields when the first RU allocation sub-field has a first value; (ii) a punctured RU242 when the first RU allocation sub-field has a second value; and (iii) an unassigned RU242 when the first RU allocation sub-field has a third value.

9. The method of claim 8, further comprising identifying a second RU allocation sub-field having a fourth value among the RU allocation sub-fields,
   wherein the second RU allocation sub-field indicates a multi-resource unit (MRU) including the RU242 when the first RU allocation sub-field has the first value.

10. The method of claim 9, wherein the MRU includes a 484-tone RU (RU484).

11. The method of claim 10, wherein the second RU allocation sub-field indicates one MRU among a first MRU of [ ]-RU242-RU484, a second MRU of RU242-[ ]-RU484, a third MRU of RU484-[ ]-RU242, and a fourth MRU of RU484-RU242-[ ].

12. The method of claim 9, wherein the fourth value indicates a number of devices allocated to the MRU by the first device.

13. The method of claim 8, wherein the punctured RU242 and the unassigned RU242 are not allocated to any device.

14. The method of claim 13, wherein the punctured RU242 includes unused frequencies to avoid interference, and
   wherein the unassigned RU242 has not yet been assigned to any device.

15. A first device configured to communicate with at least one second device in a wireless local area network (WLAN), the first device comprises processing circuitry configured to:
   generate a first resource unit (RU) allocation sub-field;

generate a physical layer protocol data unit (PPDU) including RU allocation sub-fields and at least one user field to transmit to the at least one second device, the RU allocation sub-fields including the first RU allocation sub-field, wherein the first RU allocation sub-field indicates: (i) a 242-tone RU (RU242) contributing zero user fields when the first RU allocation sub-field has a first value; (ii) a punctured RU242 when the first RU allocation sub-field has a second value, and (iii) an unassigned RU242 when the first RU allocation sub-field has a third value.

16. The first device of claim 15, wherein the processing circuitry is further configured to generate a second RU allocation sub-field having a fourth value and included in the RU allocation sub-fields, and the second RU allocation sub-field indicates a multi-resource RU (MRU) including the RU242 when the first RU allocation sub-field has the first value.

17. The first device of claim 16, wherein the MRU further includes a 484-tone RU (RU484).

18. The first device of claim 17, wherein the second RU allocation sub-field indicates one MRU among a first MRU of -RU242-RU484, a second MRU of RU242-[ ]-RU484, a third MRU of RU484-[ ]-RU242 and a fourth MRU of RU484-RU242-[ ].

19. The first device of claim 15, wherein the punctured RU242 and the unassigned RU242 are not allocated to any device.

20. The first device of claim 19, wherein the punctured RU242 includes unused frequencies to avoid interference, and wherein the unassigned RU242 has not yet been assigned to any device.

* * * * *